United States Patent
Morita

(10) Patent No.: US 9,668,246 B2
(45) Date of Patent: May 30, 2017

(54) MOBILE COMMUNICATION SYSTEM, BASE STATION AND COMMUNICATION CONTROL METHOD FOR NOTIFICATION AND MANAGEMENT OF RESOURCE ALLOCATION INFORMATION IN COMP COOPERATING SET

(71) Applicant: KYOCERA CORPORATION, Kyoto-shi, Kyoto (JP)

(72) Inventor: Kugo Morita, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 276 days.

(21) Appl. No.: 14/373,318

(22) PCT Filed: Jan. 18, 2013

(86) PCT No.: PCT/JP2013/051006
§ 371 (c)(1),
(2) Date: Jul. 18, 2014

(87) PCT Pub. No.: WO2013/108908
PCT Pub. Date: Jul. 25, 2013

(65) Prior Publication Data
US 2014/0362801 A1 Dec. 11, 2014

Related U.S. Application Data

(60) Provisional application No. 61/588,533, filed on Jan. 19, 2012, provisional application No. 61/598,714, filed on Feb. 14, 2012.

(51) Int. Cl.
*H04L 5/00* (2006.01)
*H04W 72/04* (2009.01)
(Continued)

(52) U.S. Cl.
CPC ....... *H04W 72/0413* (2013.01); *H04L 5/0035* (2013.01); *H04W 72/0426* (2013.01); *H04B 7/024* (2013.01); *H04W 76/025* (2013.01)

(58) Field of Classification Search
CPC .............. H04L 5/0032; H04L 5/0035; H04W 72/0426; H04W 72/1226; H04W 72/1278; H04B 7/024
See application file for complete search history.

(56) References Cited

U.S. PATENT DOCUMENTS 8,682,369 B2  3/2014  Yang
2010/0311349 A1* 12/2010  Koo .................... H04W 16/02
                                          455/67.11
(Continued)

FOREIGN PATENT DOCUMENTS

| JP | 2011-182063 A | 9/2011 |
| WO | 2010/148532 A1 | 12/2010 |
| WO | 2011/016560 A1 | 2/2011 |

OTHER PUBLICATIONS

3GPP TR 36.819, 3rd Generation Partnership Project, Technical Specification Group Radio Access Network; Coordinated multi-point operation for LTE physical layer aspects, (Release 11); Sep. 2011, pp. 1-68.

(Continued)

*Primary Examiner* — Hoang-Chuong Vu
(74) *Attorney, Agent, or Firm* — Hauptman Ham, LLP

(57) ABSTRACT

In a mobile communication system in which a plurality of base stations included in a CoMP cooperating set allocate a same communication resource to a user terminal to perform a communication, each of the plurality of base stations comprises a notification unit that notifies another base station included in the CoMP cooperating set of a communication resource of allocation candidate for the user terminal in the base station itself; a receiver that receives a (Continued)

notification of a communication resource of allocation candidate for the user terminal in another base station included in the CoMP cooperating set from the other base station; and a selector that selects a communication resource to be allocated to the user terminal from communication resources of allocation candidates in the plurality of base stations, based on the notification received by the receiver.

4 Claims, 25 Drawing Sheets

(51) Int. Cl.
*H04W 76/02* (2009.01)
*H04B 7/024* (2017.01)

(56) References Cited

U.S. PATENT DOCUMENTS

| | | | | |
|---|---|---|---|---|
| 2011/0051654 | A1* | 3/2011 | Blankenship | H04B 7/2606 370/315 |
| 2011/0268077 | A1* | 11/2011 | Wan | H04J 11/0053 370/329 |
| 2012/0044870 | A1* | 2/2012 | Mochizuki | H04B 7/024 370/328 |
| 2012/0135771 | A1 | 5/2012 | Futaki | |
| 2012/0149428 | A1* | 6/2012 | Yang | H04W 56/0045 455/524 |
| 2012/0176884 | A1* | 7/2012 | Zhang | H04B 7/024 370/203 |
| 2012/0178462 | A1* | 7/2012 | Kim | H04W 72/048 455/450 |
| 2012/0188950 | A1* | 7/2012 | Luo | H04L 5/0035 370/329 |
| 2012/0276915 | A1* | 11/2012 | Kubota | H04B 7/024 455/452.1 |
| 2012/0320770 | A1* | 12/2012 | Jen | H04W 72/085 370/252 |
| 2014/0029586 | A1* | 1/2014 | Loehr | H04W 56/0045 370/336 |
| 2014/0211767 | A1* | 7/2014 | Lunttila | H04W 72/1289 370/336 |

OTHER PUBLICATIONS

International Search Report mailed Mar. 12, 2013, in corresponding International Application No. PCT/JP2013/051006.

* cited by examiner

FIG. 15

X2 MEASUREMENT MESSAGE 1

| TRANSMISSION TIME: T0 |
|---|

X2 MEASUREMENT MESSAGE 2

| TRANSMISSION TIME: T0 |
|---|
| RECEPTION TIME: T2 |
| TRANSMISSION TIME: T1 |
| DL SUPPORTING CoMP TYPE:JT,DCS,CS,CB |
| UL SUPPORTING CoMP TYPE:JR,CS |

FIG. 16

| CoMP COOPERATING SET INFORMATION OF DL ONLY |
|---|
| UE C-RNTI (AFTER CHANGE) |
| UE C-RNTI (BEFORE CHANGE) |
| DL-RELATED eNB GROUP: eNB1, eNB2, eNB4,..... |
| UL-RELATED eNB GROUP: |
| ANCHOR eNB GROUP: eNB2 |
| DL FIRST TRANSMISSION ALLOCATION INTERVAL: 9[TTI] |
| UL FIRST TRANSMISSION ALLOCATION INTERVAL: 0 |
| RB OF E-PDCCH: 1 |
| OFFSET(SNF,SUBFRAME): 0,0 |

| CoMP COOPERATING SET INFORMATION OF UL ONLY |
|---|
| UE C-RNTI (AFTER CHANGE) |
| UE C-RNTI (BEFORE CHANGE) |
| DL-RELATED eNB GROUP: |
| UL-RELATED eNB GROUP: eNB2, eNB3, eNB5,..... |
| ANCHOR eNB GROUP: eNB2 |
| DL FIRST TRANSMISSION ALLOCATION INTERVAL: 0 |
| UL FIRST TRANSMISSION ALLOCATION INTERVAL: 9[TTI] |
| RB OF E-PDCCH: 1 |
| OFFSET(SNF,SUBFRAME): 0,0 |

| CoMP COOPERATING SET INFORMATION OF BOTH UL AND DL |
|---|
| UE C-RNTI (AFTER CHANGE) |
| UE C-RNTI (BEFORE CHANGE) |
| DL-RELATED eNB GROUP: eNB1, eNB2, eNB4,..... |
| UL-RELATED eNB GROUP: eNB2, eNB3, eNB5,..... |
| ANCHOR eNB GROUP: eNB2 |
| DL FIRST TRANSMISSION ALLOCATION INTERVAL: 9[TTI] |
| UL FIRST TRANSMISSION ALLOCATION INTERVAL: 9[TTI] |
| RB OF E-PDCCH: 1 |
| OFFSET(SNF,SUBFRAME): 0,0 |

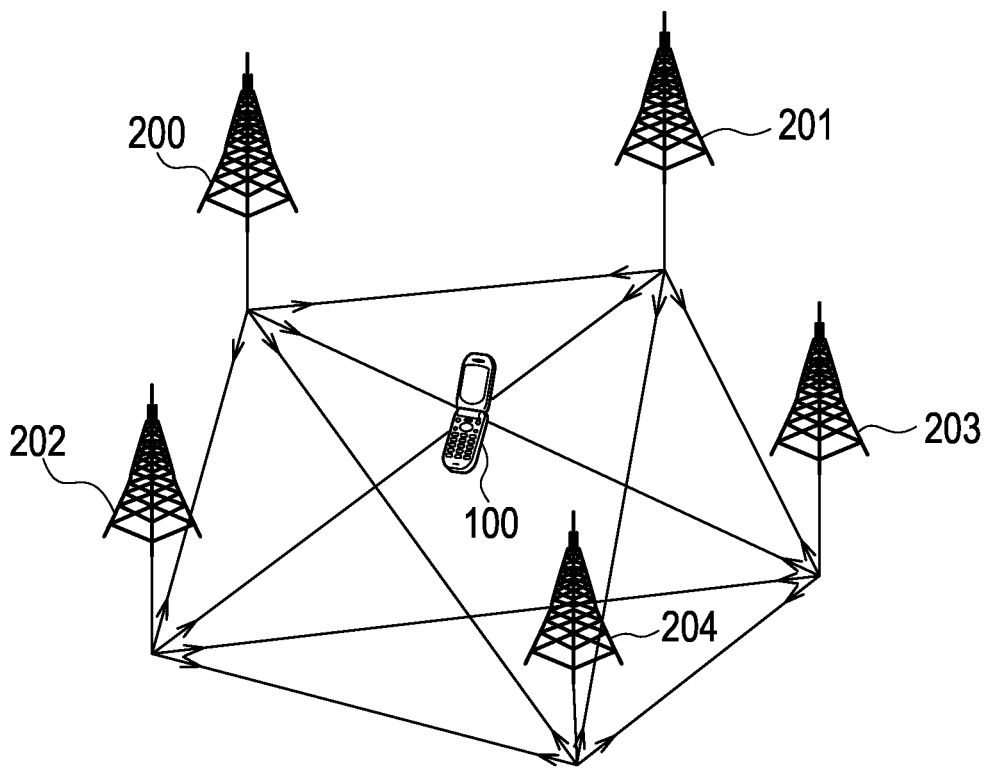

MOBILE COMMUNICATION SYSTEM, BASE STATION AND COMMUNICATION CONTROL METHOD FOR NOTIFICATION AND MANAGEMENT OF RESOURCE ALLOCATION INFORMATION IN COMP COOPERATING SET

CROSS-REFERENCE TO RELATED APPLICATION

The present application is a National Phase of International Application Number PCT/JP2013/051006 filed on Jan. 18, 2013, and claims priority of U.S. Provisional Application Nos. 61/588,533 filed Jan. 19, 2012 and 61/598,714 filed on Feb. 14, 2012.

TECHNICAL FIELD

The present invention relates to a mobile communication system, a base station and a communication control method, which support CoMP.

BACKGROUND ART

The 3GPP (3rd Generation Partnership Project) which is a mobile communication system standardization project is planning to promote the standardization of CoMP (Coordinated Multi-Point) in the release 11 or later (see, non-patent document 1).

In the CoMP, a group of antennas installed in the same place is regarded as a "point," and multiple points cooperatively perform communication with a user terminal. The group of points performing cooperative communication with the user terminal using one time-frequency resource is referred to as a CoMP cooperating set.

As one kind of CoMP, there is a JP (Joint Processing) that is a scheme in which multiple points in the CoMP cooperating set can use data to be communicated to the user terminal.

Also, as one kind of JPs in the downlink, there is a JT (Joint Transmission) in which multiple points in the CoMP cooperating set transmit data to the user terminal at the same time.

Furthermore, as one kind of JPs in the uplink, there is a JR (Joint Reception) in which multiple points in the CoMP cooperating set jointly receive data to from the user terminal.

PRIOR ART DOCUMENT

Non-Patent Document

Non-Patent Document 1: 3GPP TR 36.819 V11.0.0 (2011-09)

SUMMARY OF THE INVENTION

The above-described JT/JR-type CoMP is that multiple points in the CoMP cooperating set allocate a same communication resource to one user terminal. Here, the communication resource is time-frequency resource and/or MCS (Modulation and Coding Scheme).

However, in forming the CoMP cooperating set by different base stations, a communication resource to be allocated to the user terminal needs to be determined by negotiation among the base stations. Here, if the negotiation requires a long time due to transmission delay among the base stations, there is problem that a resource cannot be properly allocated.

Also, in the uplink, a user terminal being located far from a base station needs to advance data transmission timing so as to be timed with reception timing of the base station. For this reason, the base station creates a timing advance value for adjusting data transmission timing of the user terminal, and then, notifies the user terminal of the timing advance value.

However, when a plurality of base stations receive same data from a user terminal in the JR-type CoMP, a proper timing advance value differs depends on each eNB. For this reason, it is difficult that the timing advance value is properly set. For this reason, in the present embodiment, the following configuration is used to properly set the timing advance value.

Thus, an objective of the pre sent invention is to provide a mobile communication system, a base station, and a communication control method, which can shorten a time required to determine a communication resource to be allocated to the user terminal in CoMP.

Also, an objective of the pre sent invention is to provide a mobile communication system, a base station, and a communication control method, which can properly set the timing advance value in the JR-type CoMP.

A mobile communication system according to the present invention is characterized by a mobile communication system in which a plurality of base stations included in a CoMP cooperating set allocate a same communication resource to a user terminal to perform communication, wherein each of the plurality of base stations comprises a notification unit that notifies another base station included in the CoMP cooperating set of a communication resource of allocation candidate for the user terminal in the base station itself; a receiver that receives a notification of a communication resource of allocation candidate for the user terminal in another base station included in the CoMP cooperating set from the other base station; and a selector that selects a communication resource to be allocated to the user terminal from communication resources of allocation candidates in the plurality of base stations, based on the notification received by the receiver.

In the aforementioned characteristic, the selector may select a communication resource to be allocated to the user terminal from the communication resources of allocation candidates in the plurality of base stations, according to a selection rule common to the plurality of base stations.

In the aforementioned characteristic, the notification unit may create a timing advance value to adjust uplink transmission timing and further notifies another base station included in the CoMP cooperating set of the created timing advance value, the receiver may further receive a timing advance value created by another base station included in the CoMP cooperating set from the other base station, and the common selection rule may be a rule that a communication resource of allocation candidate in a base station that creates a timing advance value causing the longest delay in uplink transmission timing among the plurality of base stations is to be selected as a communication resource to be allocated to the user terminal.

In the aforementioned characteristic, the notification unit may select MCS to be applied by the base station to the user terminal and further notifies another base station included in the CoMP cooperating set of the selected MCS, the receiver may further receive MCS between the user terminal and another base station included in the CoMP cooperating set from the other base station, and the common selection rule may be a rule that a communication resource of allocation candidate in a base station that selects MCS having the highest transmission rate among the plurality of base stations is to be selected as a communication resource to be allocated to the user terminal.

A base station according to the present invention is characterized by a base station included in a CoMP cooperating set in a mobile communication system in which a plurality of base stations included in the CoMP cooperating set allocate a same communication resource to a user terminal to perform communication, the base station comprising: a notification unit that notifies another base station included in the CoMP cooperating set of a communication resource of allocation candidate for the user terminal in the base station itself; a receiver that receives a notification of a communication resource of allocation candidate for the user terminal in another base station included in the CoMP cooperating set from the other base station; and a selector that selects a communication resource to be allocated to the user terminal from communication resources of allocation candidates in the plurality of base stations, based on the notification received by the receiver.

A communication control method according to the present invention is characterized by a communication control method in a mobile communication system in which a plurality of base stations included in a CoMP cooperating set allocate a same communication resource to a user terminal to perform communication, the communication control method, executed by each of the plurality of base stations, comprising: a step A of notifying another base station included in the CoMP cooperating set of a communication resource of allocation candidate for the user terminal in the base station itself; a step B of receiving a notification of a communication resource of allocation candidate for the user terminal in another base station included in the CoMP cooperating set from the other base station; and a step C of selecting a communication resource to be allocated to the user terminal, from communication resources of allocation candidates in the plurality of base stations based on the notification received at step B.

A mobile communication system according to the present invention is characterized by a mobile communication system in which a plurality of base stations included in a CoMP cooperating set performs uplink CoMP communication with a user terminal, wherein each of the plurality of base stations comprises a transmission unit that creates a timing advance value for adjusting data transmission timing of the user terminal and transmits the created timing advance value to another base station included in the CoMP cooperating set, a receiver that receives a timing advance value created in another base station from the other base station included in the CoMP cooperating set, and a notification unit that notifies the user terminal of the timing advance value selected among the timing advance values in the plurality of base stations based on the notification received by the receiver.

In the aforementioned characteristic, the notification unit may select a timing advance value causing the longest delay in the data transmission timing among the timing advance values in the plurality of base stations, and may notify the user terminal of the selected timing advance value.

In the aforementioned characteristic, each of the plurality of base stations may further comprise a storage for storing the timing advance value received by the receiver; and an update unit that updates the timing advance value stored in the storage with the received timing advance value every time the receiver receives the timing advance value, and the notification unit may select the timing advance value that the user terminal is to be notified of among the timing advance values stored in the storage and may notify the user terminal of the selected timing advance value.

In the aforementioned characteristic, if PDSCH resource to be allocated to the user terminal has free space, the notification unit may notify the user terminal of the selected timing advance value using the free space of the PDSCH resource.

In the aforementioned characteristic, the user terminal may have a first timer for determining a valid period of a received timing advance value, a main base station among the plurality of base stations may have a second timer corresponding to the first timer, and the main base station may control so as to notify the user terminal of the selected timing advance value when the second timer will expire soon.

A base station according to the present invention is characterized by a base station included in a CoMP cooperating set in a mobile communication system in which the CoMP cooperating set performs uplink CoMP communication with a user terminal, the base station comprising: a transmission unit that creates a timing advance value for adjusting data transmission timing of the user terminal and transmits the created timing advance value to another base station included in the CoMP cooperating set, a receiver that receives a timing advance value created in another base station included in the CoMP cooperating set from the other base station, and a notification unit that notifies the user terminal of the timing advance value selected among the timing advance values in the plurality of base stations based on the notification received by the receiver.

A communication control method according to the present invention is characterized by a communication control method in a mobile communication system in which a plurality of base stations included in a CoMP cooperating set performs uplink CoMP communication with a user terminal, executed by the plurality of base stations, comprising: a step A of creating a timing advance value for adjusting data transmission timing of the user terminal and transmitting the created timing advance value to another base station included in the CoMP cooperating set, a step B of receiving a timing advance value created in another base station included in the CoMP cooperating set from the other base station, and a step C of notifying the user terminal of the timing advance value selected among the timing advance values in the plurality of base stations based on the notification received at the step C.

BRIEF DESCRIPTION OF THE DRAWINGS

FIG. 15 is an X2 measurement message.

FIG. 16 illustrates an example of CoMP cooperating set information.

FIG. 21 illustrates a state where each eNB included in a CoMP cooperating set notifies the other eNBs of an allocation candidate band in a mutual manner.

FIG. 22 illustrates an example of band allocation information.

DESCRIPTION OF THE EMBODIMENT

Figure 1:
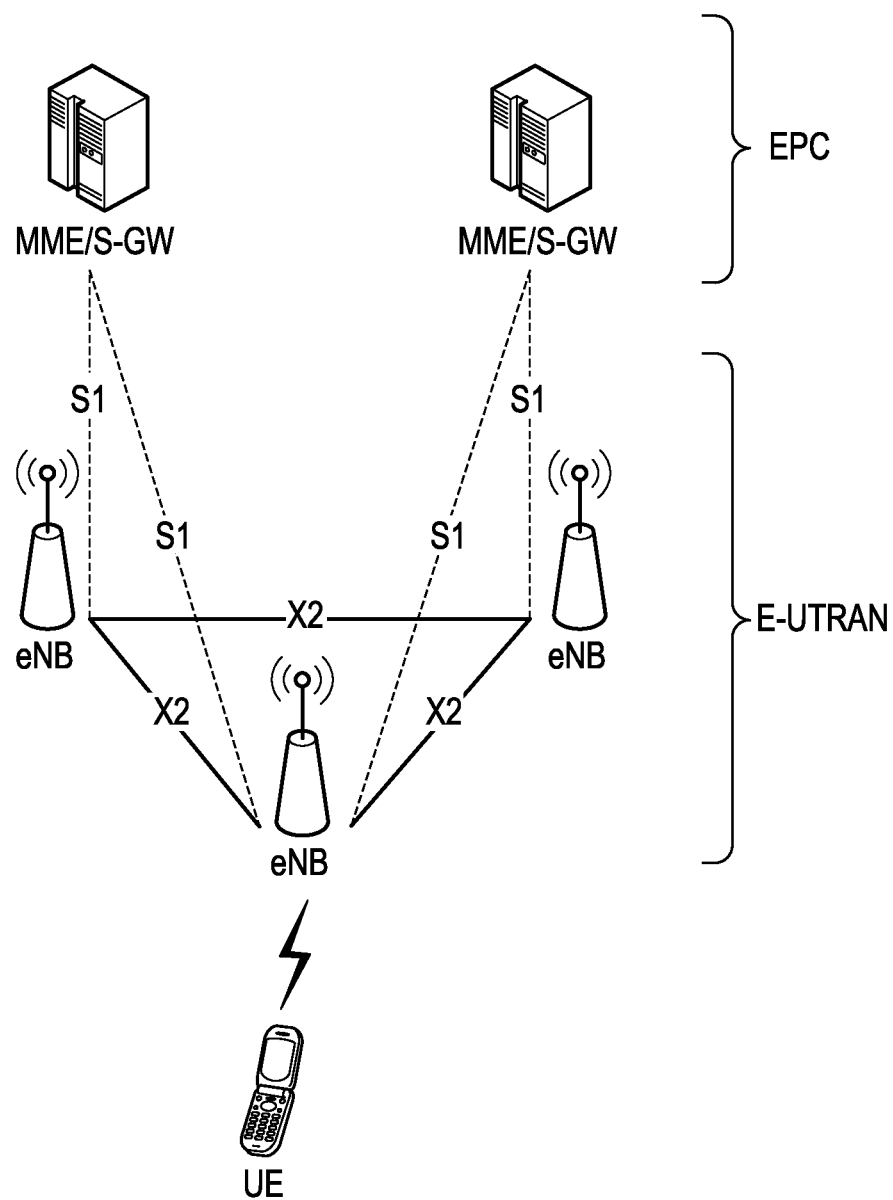
FIG. 1 illustrates a configuration of an LTE system.

Embodiments of the present invention are described below by referring to the drawings. A mobile communication system according to the present embodiment is configured based on the 3GPP standards in Release 10 or later (i.e., LTE Advanced).

Hereinafter, the description is given in the following order of (1) Outline of Embodiments, (2) Outline of LTE System, (3) Configurations of UE and eNB, (4) Outline of CoMP, (5) Overall Control Flow, (6) CoMP Cooperating Set, (7) CoMP Communication Control, and (8) Other Embodiments.

(1) Outline of Embodiment

In a mobile communication system according to the present embodiment, a plurality of eNBs included in a CoMP cooperating set allocate a same communication resource to a UE to perform communication. Each of the plurality of eNBs comprises a notification unit that notifies another eNB included in the CoMP cooperating set of a communication resource of allocation candidate for the UE in the eNB itself; a receiver that receives a notification of a communication resource of allocation candidate for the UE in another eNB included in the CoMP cooperating set from the other eNB; and a selector that selects a communication resource to be allocated to the UE from communication resources of allocation candidates in the plurality of eNBs, based on the notification received by the receiver.

In a mobile communication system according to the present embodiment, a plurality of eNB included in a CoMP cooperating set performs uplink CoMP communication with a user terminal. Each of the plurality of base stations comprises a transmission unit that creates a timing advance value for adjusting data transmission timing of the user terminal and transmits the created timing advance value to another base station included in the CoMP cooperating set, a receiver that receives a timing advance value created in another base station from the other base station included in the CoMP cooperating set, and a notification unit that notifies the user terminal of the timing advance value selected among the timing advance values in the plurality of base stations based on the notification received by the receiver.

(2) Outline of LTE System

An outline of the LTE system is described in the following order of (2.1) Entire Configuration of LTE System, (2.2) Frame Configuration and Physical Channel Configuration, (2.3) Protocol Stack, and (2.4) Timing Advance.

(2.1) Entire Configuration of LTE System

FIG. 1 illustrates a configuration of an LTE system 1.

As depicted in FIG. 1, the LTE system 1, UE (User Equipment), E-UTRAN (Evolved-UMTS Terrestrial Radio Access Network), and EPC (Evolved Packet Core).

The UE is a mobile radio communication apparatus and is equivalent to a user terminal.

The E-UTRAN includes a plurality of eNBs (evolved Node-B). The eNB is a stationary radio communication apparatus performing radio communication with UE and is equivalent to a base station. Each eNB forms one or more of cells. The eNB has, for example, a radio resource management (RRM) function, a user data routing function and a measurement control function for mobility control and scheduling.

The EPC includes an MME (Mobility Management Entity) and an S-GW (Serving-Gateway). The EPC is equivalent to a core network. The MME is a network entity performing various kinds of mobility control on the UE and is equivalent to a control station. The S-GW is a network entity performing user data transferring control and is equivalent to an exchange.

The eNBs are connected with one another through an X2 interface. Also, the eNB is connected with the MME and the S-GW through an S1 interface.

(2.2) Frame Configuration and Physical Channel Configuration

Figure 2:
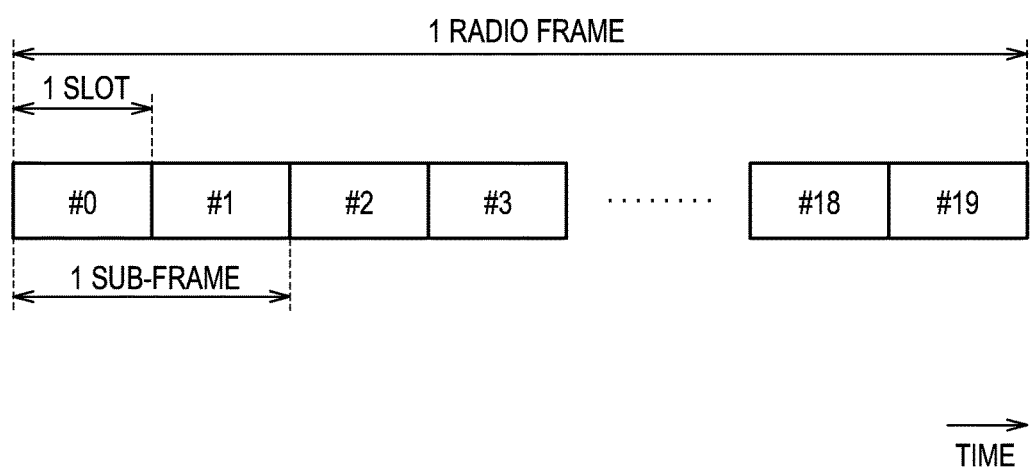
FIG. 2 illustrates a configuration of a radio frame used in the LTE system.

FIG. 2 illustrates a configuration of a radio frame which is used in the LTE system 1. The LTE system 1 employs OFDMA (Orthogonal Frequency Division Multiplexing Access) for a downlink and SC-FDMA (Single Carrier Frequency Division Multiple Access) for an uplink.

As depicted in FIG. 2, the radio frame includes 10 sub-frames arranged in a time direction and each sub-frame includes two slots arranged in the time direction. Each sub-frame has a length of 1 ms and each slot has a length of 0.5 ms. Each sub-frame includes a plurality of resource blocks (RB) in a frequency direction and a plurality of symbols in the time direction. A guard section which is called as a cyclic prefix (CP) is provided in the head of each symbol.

(2.2.1) Downlink

In the downlink, a section including a several symbols from the head of each sub-frame (specifically, up to 3 or 4 symbols) is a control domain which is mainly used as physical downlink control channel (PDCCH). Also, the remaining section of each sub-frame is a data domain which is mainly used as physical downlink shared channel (PDSCH).

The PDCCH transmits a control signal. The control signal is, for example, uplink SI (Scheduling Information), downlink SI, and TPC bit. The uplink SI indicates allocation of uplink radio resources and the downlink SI indicates allocation of downlink radio resources. The TPC bit is a signal instructing increase or decrease of uplink power transmission. These control signals are referred to as downlink control information (DCI).

The PDSCH carries control signals and/or user data. For example, the downlink data domain may be allocated only to the user data or may be allocated in such a manner that user data and control signals are multiplexed.

Note that the control signal which is transmitted via PDSCH includes a timing advance value. The timing advance value is a transmission timing correction value of UE and is determined by an eNB based on the uplink signal which is transmitted from the UE. The timing advance value is described later in detail.

Also, an acknowledgement response (ACK)/a negative acknowledgement response (NACK) are carried via a physical HARQ indicator channel (PHICH). The ACK/NACK indicates whether a signal transmitted via an uplink physical channel (for example, PUSCH) is successfully decoded.

(2.2.2) Uplink

In the uplink, both end portions in the frequency direction in each sub-frame are control domains which are mainly used as physical uplink control channel (PUCCH). Also, a center portion in the frequency direction of each sub-frame is a data domain which is mainly used as physical uplink shared channel (PUSCH).

The PUCCH carries a control signal. The control signal is, for example, CQI (Channel Quality Indicator), PMI (Precoding Matrix Indicator), RI (Rank Indicator), SR (Scheduling Request), or ACK/NACK.

The CQI indicates a downlink channel quality and is used for determining a recommendable modulation scheme, coding rate and the like to be used for downlink transmission. The PMI indicates a precoding matrix which is desirable to be used for downlink transmission. The RI indicates the number of layers (the number of streams) which can be used for downlink transmission. The SR is a signal for requesting allocation of an uplink radio resource (resource block). The ACK/NACK indicates whether or not a signal transmitted via a downlink physical channel (for example, PDSCH) is successfully decoded.

The PUSCH is a physical channel which carries control signals and/or user data. For example, the uplink data domain may be allocated only to the user data or may be allocated in such a manner that user data and control signals are multiplexed.

(2.3) Protocol Stack

Figure 3:
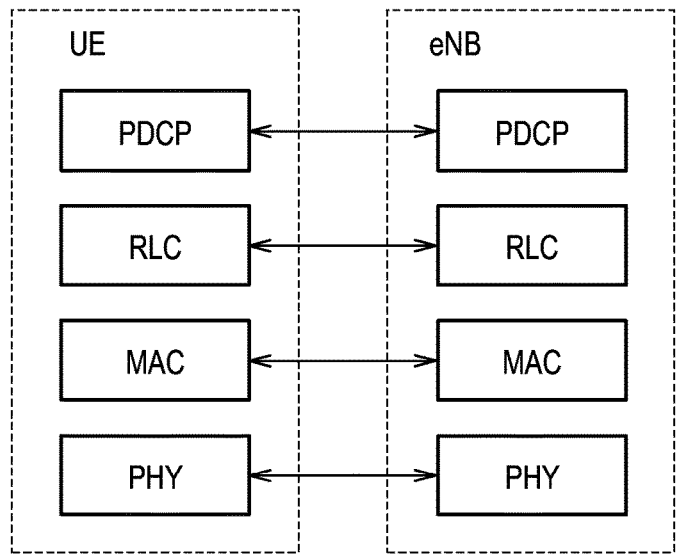
FIG. 3 illustrates a radio interface protocol in a user plane.
Figure 4:
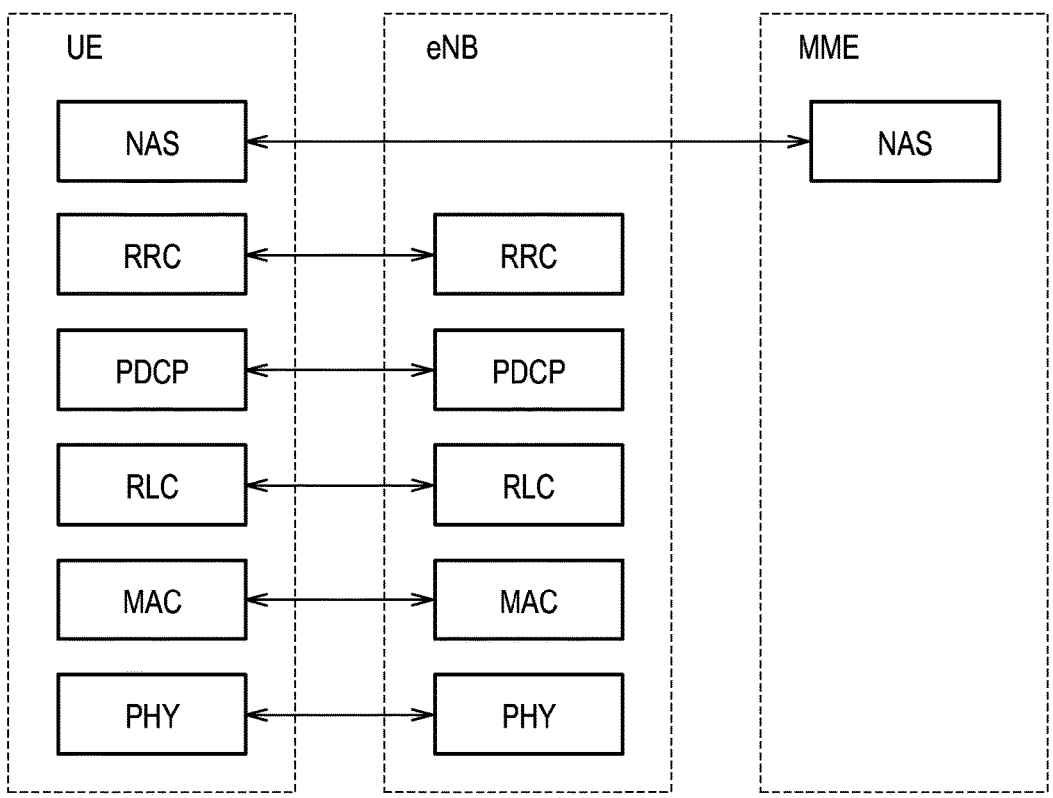
FIG. 4 illustrates a radio interface protocol in a control plane.
Figure 5:
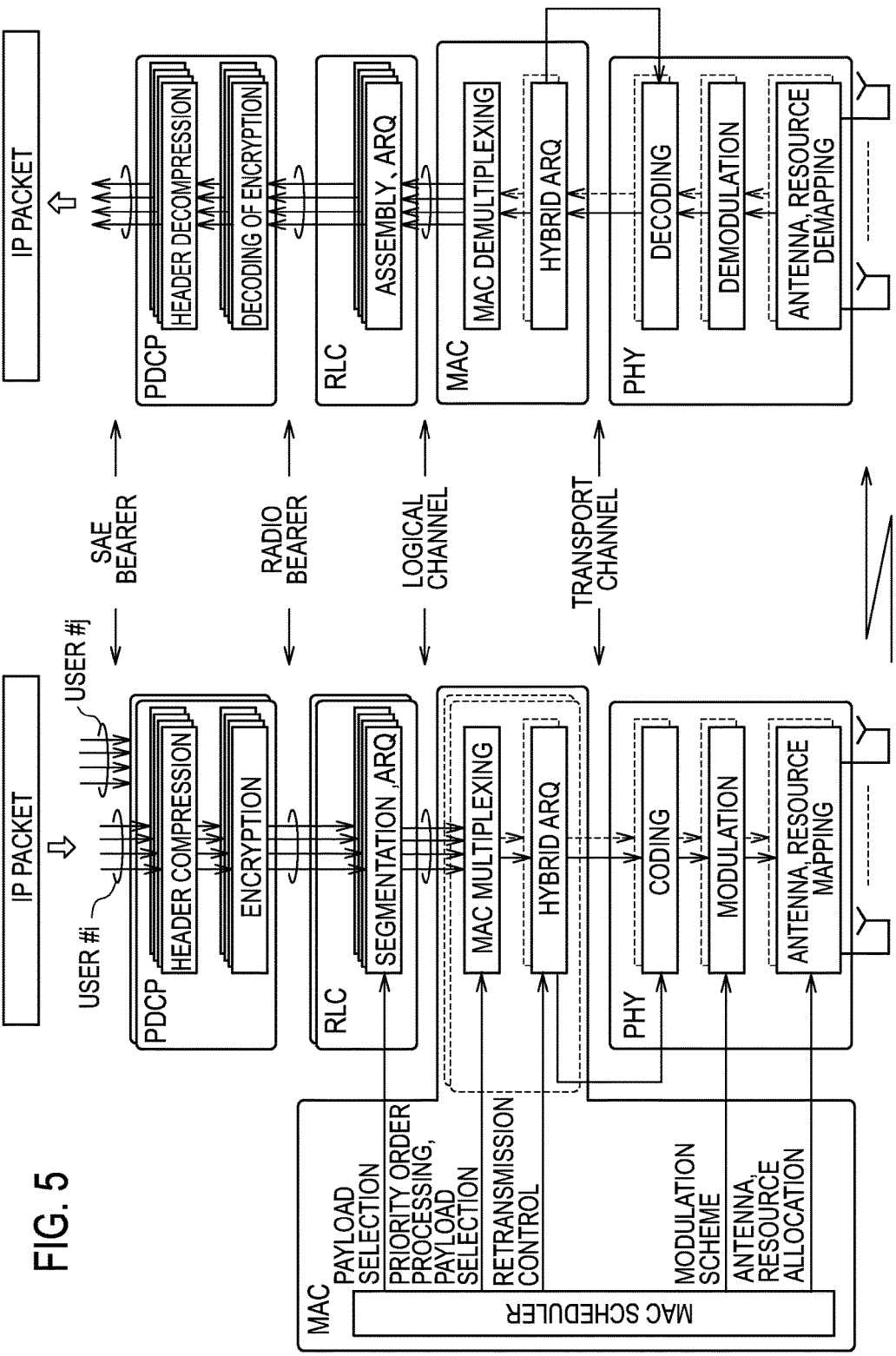
FIG. 5 illustrates each layer processing using a downlink as an example.
Figure 6:
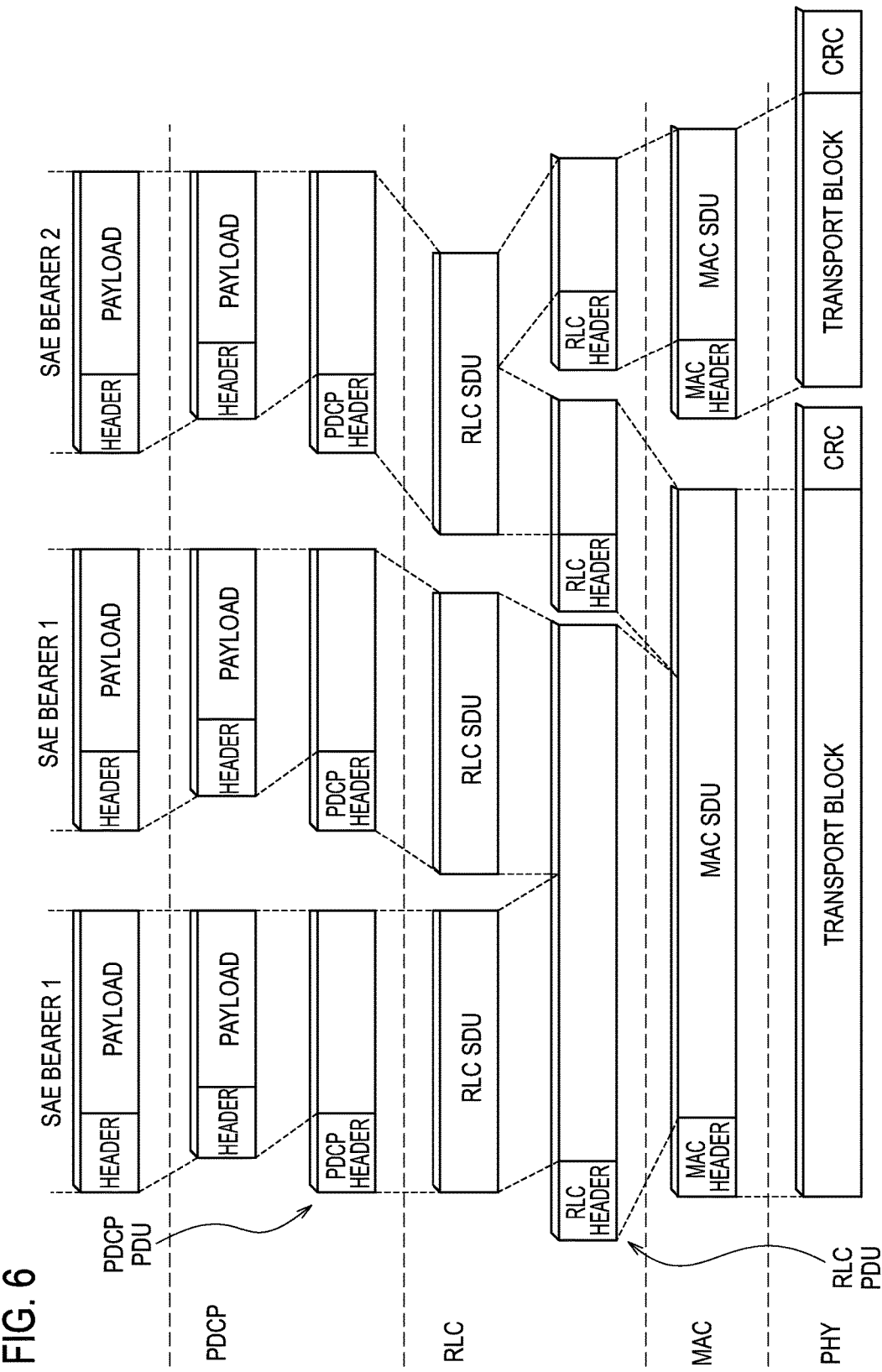
FIG. 6 illustrates data flow in each layer.

FIG. 3 illustrates a radio interface protocol in a user plane, and FIG. 4 illustrates a radio interface protocol in a control plane. The user plane is a protocol stack for user data transmission and the control plane is a protocol stack for control signal transmission. FIG. 5 illustrates each layer processing using a downlink as an example. FIG. 6 illustrates data flow in each layer.

The radio interface protocol is divided into layers 1 to layer 3 in the OSI reference model. The layer 1 is a physical (PHY) layer. The layer 2 includes MAC (Media Access Control) layer, RLC (Radio Link Control) layer, and PDCP (Packet Data Convergence Protocol) layer. The layer 3 includes RRC (Radio Resource Control) layer.

The physical layers perform data coding-decoding, modulation-demodulation, antenna mapping-demapping and resource mapping-demapping. The physical layer provides transmission service to an upper layer using the above-described physical channel. Data is transmitted via the physical channel between the physical layer of UE and the physical layer of the eNB. The physical layer is connected with a MAC layer via a transport channel.

The MAC layer performs priority control of data and retransmission processing or the like through hybrid ARQ (HARQ). Data is transmitted via the transport channel between the MAC layer of UE and the MAC layer of the eNB. Also, the MAC layer performs mapping between a logical channel and a transport channel. The MAC layer of the eNB includes an uplink transport format and a MAC scheduler determining a resource block. The transport format contains a transport block size, modulation-coding scheme (MAC) and antenna mapping. The MAC layer is connected with the RLC layer via the logical channel.

The RLC layer receives data from a PDCP layer in the form of RLC SDU (Service Data Unit). Data is transmitted via a logical channel between the RLC layer of UE and the RCL layer of the eNB. The RLC layer transmits date to the RLC layer on the receiver side using functions of the MAC layer and the physical layer. Note that PDU in the upper layer corresponds to SDU in the lower layer. For this reason, the RLC SDU is sometimes referred to as PDCP PDU (Protocol Data Unit). An RLC PDU length changes along with a situation of transmission rate optimization and a dynamic scheduling. For this reason, a payload length to be transmitted in a sub-frame can be changed. Thus, the RLC layer divides and couples RLC SDU (PDCP PDU) according to the RLC PDU length.

The RCL layer includes three modes. Specifically, the RCL layer operates in any of a transparent mode (TM), unacknowledgement response mode (UM), and acknowledgement response mode (AM), in response to a request from an application. In the TM mode, the RLC layer is bypassed. In the UM mode, data division and coupling are performed but ARQ retransmission is not performed. In the AM mode, not only data division and assembly are performed but also ARQ retransmission is performed in case of RLC PDU transmission failure. Higher reliability can be obtained by performing both HARQ in the MAC layer and ARQ in the RLC layer.

The RLC layer is connected with a PDCP layer via a radio bearer.

The PDCP layer performs header compression and decompression and performs encryption and decoding. The header compression reduces an IP packet header size containing unnecessary control information. Data is transmitted via the radio bearer between the PDCP layer of UE and the PDCP layer of the eNB.

The RRC layer is defined only in the control plane. The RRC layer controls a logical channel, a transport channel, and a physical channel according to establishment, reestablishment and release of the radio bearer. When RRC connection is present between RRC of the UE and RRC of the eNB, the UE is in the RRC connected state, and if not, the UE is in the RRC Idle state.

An NAS (Non-Access Stratum) layer located in an upper layer of the RRC performs session management and mobility management.

(2.4) Timing Advance

In the uplink, UE being located far from an eNB needs to advance data transmission timing so as to be timed with reception timing of eNB. For this reason, the eNB measures timing of an uplink signal received from UE, creates a timing advance value for adjusting (correcting) data transmission timing of UE, and then, notifies the UE of the timing advance value as TA MCE (Timing Advance Command Mac Control Element).

The timing advance value is an offset value of timing at which UE starts transmission with respect to the current transmission timing of UE. Since the UE may move, the eNB updates the timing advance value regularly and transmits the timing advance value to the UE.

Also, if the UE transmits nothing for a certain period of time, the timing advance value for the UE becomes uncertain. Accordingly, in order to avoid unadjusted UE transmission, both the eNB and the UE include a timer ("Time Alignment Timer") for determining a valid period of a timing advance value, and determine whether the UE is out of synchronization in the uplink.

Figure 7:
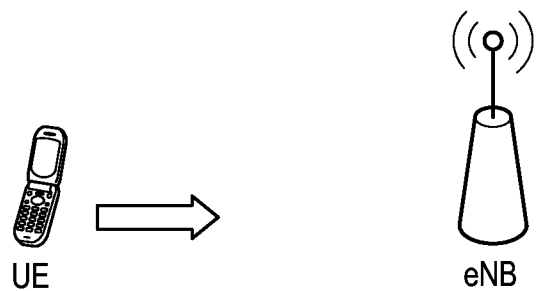
FIG. 7 is a drawing for illustrating a timing advance value.
Figure 8:
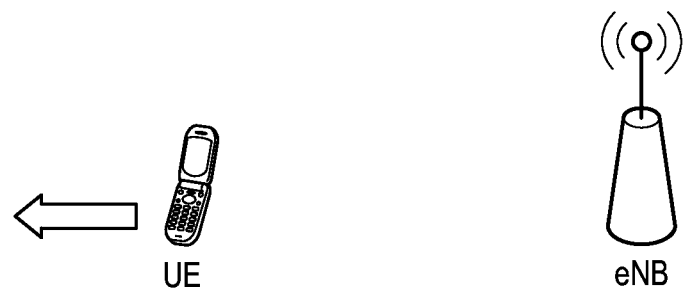
FIG. 8 is a time chart for illustrating a timing advance value.

FIG. 7 and FIG. 8 are drawings for illustrating a timing advance value. FIG. 7 and FIG. 8 depict a situation where UE moves.

As illustrated in FIG. 7, in the situation where UE approaching eNB, the eNB creates a negative offset value as a timing advance value with respect to the current transmission timing of the UE so as to delay the transmission timing of the UE. Then, the eNB notifies the UE of the timing advance value (TA MCE). When receiving the timing advance value (TA MCE), the UE delays the transmission timing according to the timing advance value (TA MCE).

As illustrated in FIG. 8, in the situation where UE is moving away from eNB, the eNB creates a positive offset value as a timing advance value with respect to the current transmission timing of the UE so as to advance the transmission timing of the UE. Then, the eNB notifies the UE of the timing advance value (TA MCE). When receiving the timing advance value (TA MCE), the UE advances the transmission timing according to the timing advance value (TA MCE).

(3) Configurations of UE and eNB

Figure 9:
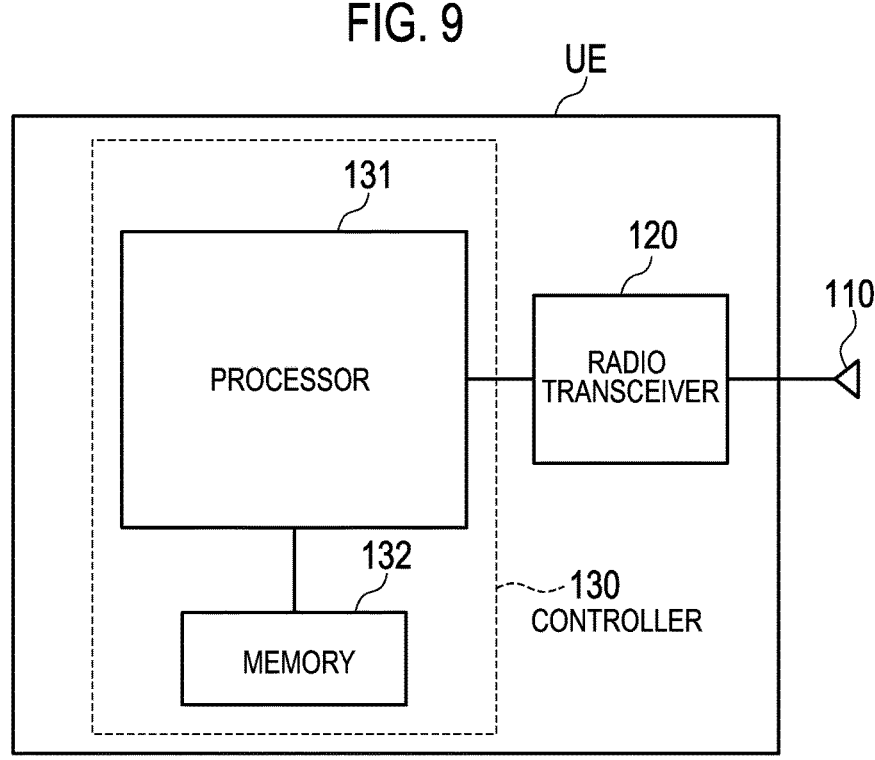
FIG. 9 is a block diagram of UE.

Hereinafter, the description is given to (3.1) Configuration of UE and (3.2) Configuration of eNB
(3.1) Configuration of UE
FIG. 9 is a block diagram of UE.
As shown in FIG. 9, UE has an antenna 110, a radio transceiver 120, and a controller 130. The UE may further have a user interface and a battery.

The antenna 110 and the radio transceiver 120 are used for transmission and reception of a radio signal.

The controller 130 performs processing in each of the above-described layers. The controller 130 includes a processor 131 and a memory 132. The processor 131 performs processing in each of the layers by executing a program stored in the memory 132.

Figure 10:
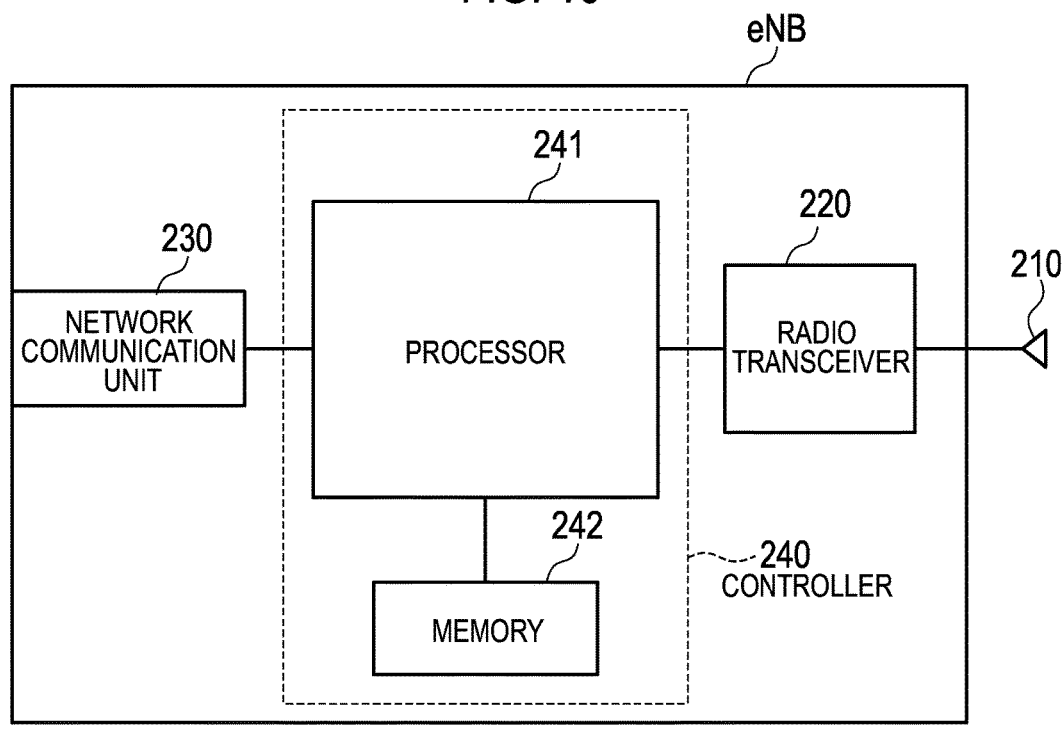
FIG. 10 is a block diagram of eNB.

Also, the processor 131 performs control in the UE regarding CoMP communication (the detail is described later). The memory 132 stores information to be used for control in the UE regarding the CoMP communication.
(3.2) Configuration of eNB
FIG. 10 is a block diagram of eNB.
As illustrated in FIG. 10, eNB has an antenna 210, a radio transceiver 220, a network communication unit 230, and a controller 240.

The antenna 210 and the radio transceiver 220 are used for transmission and reception of a radio signal. The network communication unit 230 performs communication on an X2 interface and an S1 interface.

The controller 240 performs processing in each of the above-described layers. The controller 240 includes a processor 241 and a memory 242. The processor 241 performs processing in each of the layers by executing a program stored in the memory 242.

Also, the processor 241 performs control in the eNB regarding CoMP communication (the detail is described later). The memory 242 stores information to be used for control in the eNB regarding the CoMP communication.

(4) Outline of CoMP

In CoMP, a group of antennas installed in a same place is regarded as a "point," and multiple points cooperatively perform communication with UE. The group of points performing cooperative communication with UE is referred to as a CoMP cooperating set.

As one kind of CoMP, there is a JP (Joint Processing) which is a scheme in which data to be communicated with UE can be used in multiple points in the CoMP cooperating set.

As one kind of JPs in the downlink, there is a JT (Joint Transmission) in which multiple points in the CoMP cooperating set transmit data to UE at the same time. As one kind of JPs in the uplink, there is a JR (Joint Reception) in which multiple points in the CoMP cooperating set receive same data from UE.

In addition, there is DCS (Dynamic Cell Selection) which is one kind of JPs in the downlink and in which only one point having the best radio state performs transmission. Also, there is CS (Coordinated Scheduling) in which only one point holds data regarding each of the uplink and the downlink while multiple points cooperatively perform scheduling/resource allocation. Furthermore, there is CB (Coordinated Beamforming) in which only one point holds data regarding mainly the downlink while multiple points cooperatively perform beamforming.

Hereinafter, the description is given to a case where eNBs operate as points in the CoMP cooperating set and perform JP-type (JT, JR) CoMP.

Figure 11:
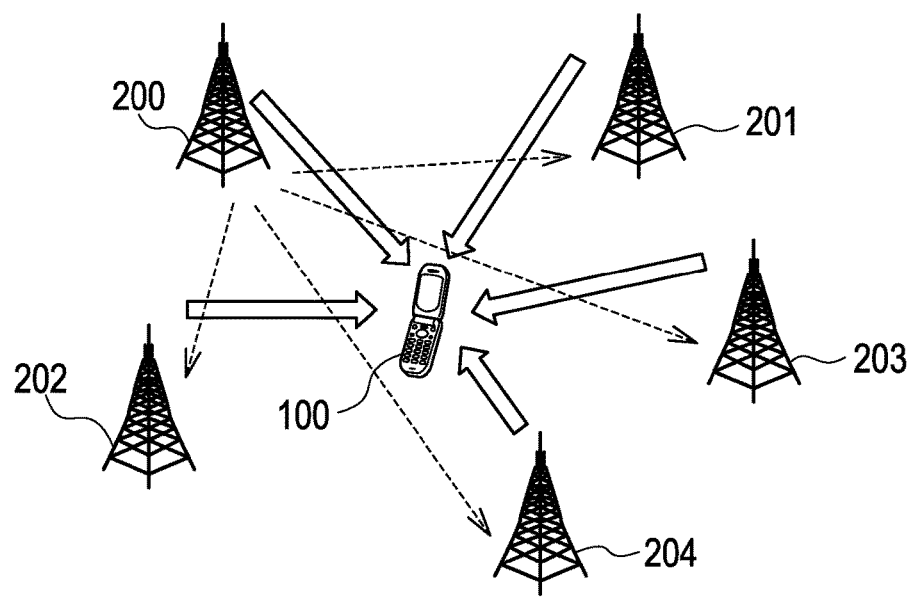
FIG. 11 is a drawing for illustrating a JT-type CoMP.

FIG. 11 is a drawing for illustrating a JT-type CoMP. In FIG. 11, the UE 100 is located in a coverage area edge portion (i.e., a boundary region) of each eNB.

As illustrated in FIG. 11, the CoMP cooperating set includes eNB 200 to eNB 204. The eNB 200 is an anchor eNB which receives data addressed from S-GW to the UE 100, on behalf of the eNB 200 to the eNB 204. The anchor eNB 200 is equivalent to a main base station which performs control of downlink CoMP communication. Also, the anchor eNB 200 is equivalent to a CoMP management apparatus which manages a CoMP cooperating set. The other eNBs (eNB 201 to eNB 204) are equivalent to subordinate base stations.

First, the anchor eNB 200 receives data from S-GW and transfers data to the eNB 201 to the eNB 204 over the X2 interface.

Second, each of the eNB 200 to the eNB 204 transmits data to the UE 100 on a radio interface using a same communication resource (same time-frequency resource and same MCS).

Third, the UE 100 receives data transmitted from the eNB 200 to the eNB 204. As described above, when the UE 100 is located in the coverage area edge portion and receives data from the plurality of eNBs through the same communication resource, a combined gain can be obtained. Thus, a communication quality is improved.

Figure 12:
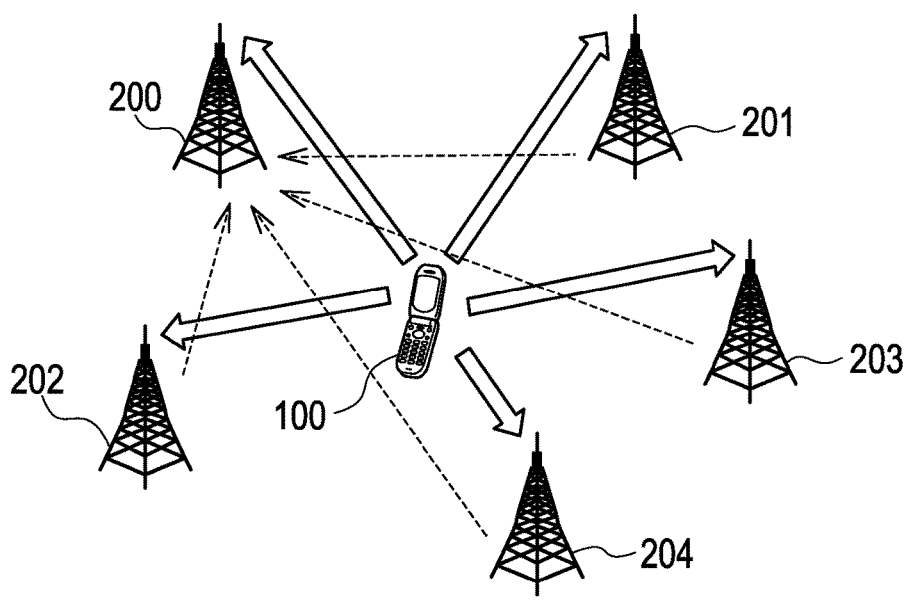
FIG. 12 is a drawing for illustrating a JR-type CoMP.

FIG. 12 is a drawing for illustrating a JR-type CoMP. In FIG. 12, the UE 100 is located in a coverage area edge portion (i.e., a boundary region) of each eNB.

As illustrated in FIG. 12, the eNB 200 of the eNB 200 to the eNB 204 included in the CoMP cooperating set is an anchor eNB, representing the eNB 200 to the eNB 204, which performs data transmission to EPC (specifically, S-GW). The anchor eNB 200 is equivalent to a main base station which performs control of uplink CoMP communication. Other eNBs (eNB 201 to eNB 204) are equivalent to subordinate base stations.

First, the UE 100 transmits data on the radio interface using a predetermined communication resource.

Second, each of the eNB 200 to the eNB 204 performs reception with the predetermined communication resource. Each of the eNB 201 to the eNB 204 transfers data from the UE 100 over the X2 interface to the anchor eNB 200 in a state of a baseband signal without performing decoding the received data (specifically decoding in the physical layer). Note that there is also a scheme of transferring data after being decoded in addition to the scheme of performing transfer in the state of baseband signal.

Third, the anchor eNB 200 receives data from the eNB 201 to the eNB 204. The anchor eNB 200 decodes the data which is received by itself from the UE 100 and the data which is received from the eNB 201 to the eNB 204 after the data is combined. Then, the anchor eNB 200 transfers the decoded data to the S-GW on the S1 interface.

In this manner, the data which is received by the plurality of eNBs is combined to obtain a combined gain. Thus, the communication quality is improved.

Note that, a frequency re source (resource block), a time resource (sub-frame), and modulation scheme (MCS) which are used for the CoMP communication are collectively referred to as a "band".

(5) Overall Control Flow

Figure 13:
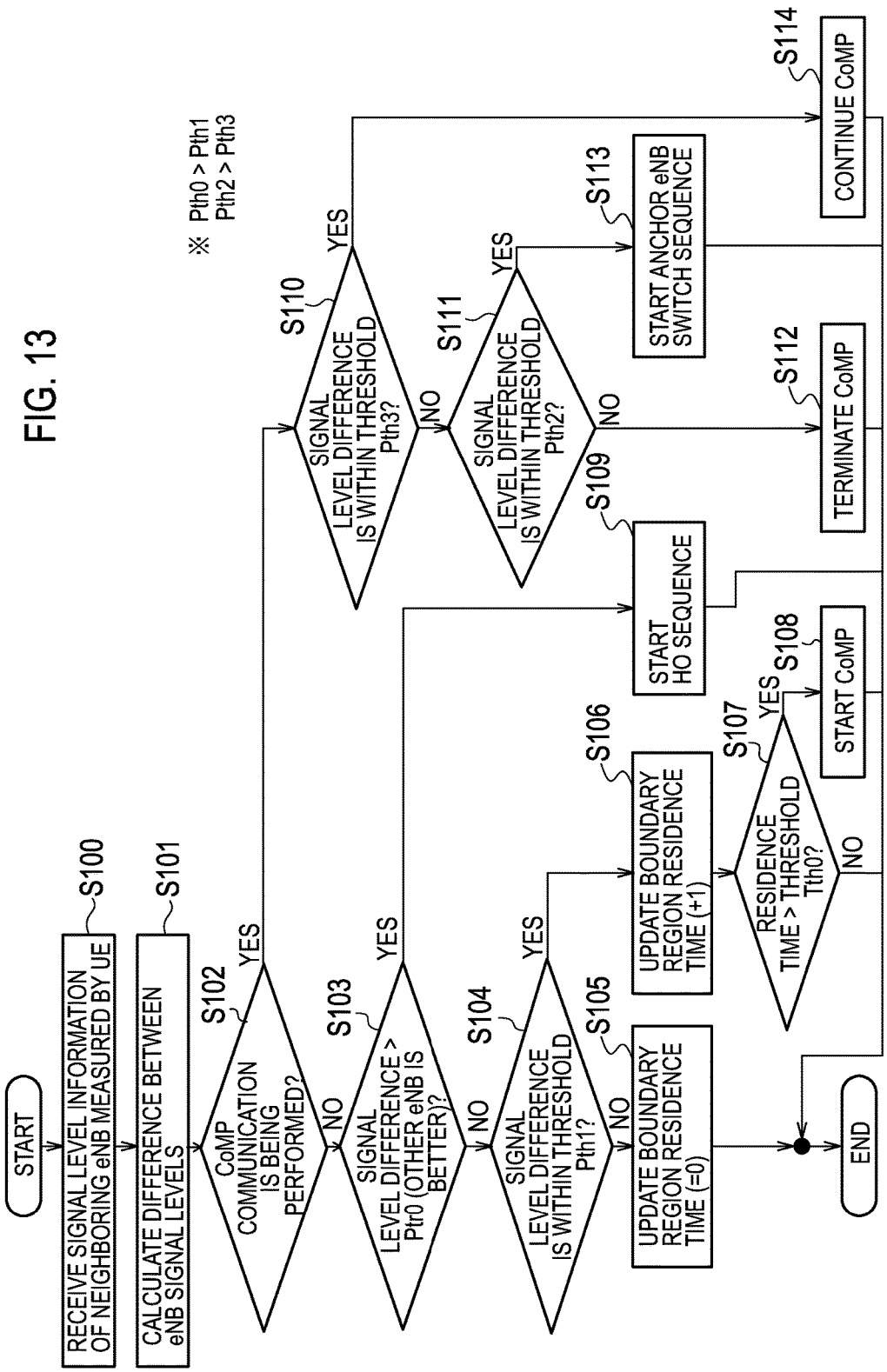
FIG. 13 illustrates a control flow of start, continuation, and termination of CoMP communication.

FIG. 13 illustrates an overall control flow, more specifically, a control flow of start, continuation, and termination of CoMP communication. The flow is periodically executed by the eNB 200 operating as an anchor eNB. However, before starting the CoMP communication, the present flow is periodically executed by the eNB 200 configuring a serving cell of UE.

As illustrated in FIG. 13, at step S100, the eNB 200 receives a Measurement Report from the UE 100. The measurement report contains information of a signal level (specifically, a power level) of a reference signal received by the UE from each eNB (or each cell).

At step S101, the eNB 200 calculates a difference between a signal level of the eNB 200 and a signal level of another eNB based on the measurement report received at step S100.

If the CoMP communication is not performed (step S102; No), the eNB 200 checks at step S103 if the signal level of the other eNB is higher than its own signal level and the signal level difference calculated at step S101 is larger than a threshold Pth0. If the signal level of the other eNB is higher and the signal level difference calculated at step S101 is larger than the threshold Pth0 (step S103; Yes), processing proceeds to step S109, and if not (step S103; No), processing proceeds to step S104.

At step S109, the eNB 200 starts a handover sequence to the other eNB. Accordingly, the UE 200 performs handover to the other eNB. Note that an existing specification can be applied to the handover sequence.

On the other hand, at step S104, the eNB 200 checks if the signal level difference calculated at step S101 is within a range of a threshold Pth1. Here, the Pth1 is a value smaller than the Pth0. When the signal level difference calculated at step S101 is within the range of the threshold Pth1 (step S104; Yes), processing proceeds to step S106, and if not (step S104; No), processing proceeds to step S105.

At step S105, the eNB 200 updates a boundary region residence time to 0. This is because the signal level difference is relatively large if the step S104 is No, and thus the UE 100 cannot be regarded as being located in the boundary region.

Meanwhile, at step S106, the eNB 200 adds 1 to the boundary region residence time. Thereafter, processing proceeds to step S107.

At step S107, the eNB 200 checks if the boundary region residence time exceeds a threshold Tth0. When the boundary region residence time exceeds the threshold Tth0 (step S107; Yes), processing proceeds to step S108. When the boundary region residence time exceeds the threshold Tth0, the UE 100 is regarded as staying in the boundary region.

At step S108, the eNB 200 determines that the CoMP communication is to be started. When the CoMP communication is started, the eNB 200 performs setting processing of the CoMP cooperating set (the detail is described later).

On the other hand, when the CoMP communication is being performed (step S102; Yes), at step S110, the eNB 200 checks if the signal level difference calculated at step S101 is within a range of a threshold Pth3. When the signal level difference calculated at step S101 is within the range of the threshold Pth3 (step S110; Yes), processing proceeds to step S114, and if not (step S110; No), processing proceeds to step S111.

At step S114, the eNB 200 determines that the CoMP communication is to be continued.

Note that the eNB 200 may be added anew to the CoMP cooperating set during execution of the CoMP communication based on the measurement report from the UE 100. The details of the eNB adding sequence is described later.

On the other hand, at step S111, the eNB 200 checks if the signal level difference calculated at step S101 is within a range of a threshold Pth2. Here, the Pth2 is a value larger than the Pth3. When the signal level difference calculated at step S101 is within the range of the threshold Pth2 (step S111; Yes), processing proceeds to step S113, and if not (step S111; No), processing proceeds to step S112.

At step S113, the eNB 200 starts an anchor switch sequence for switching the anchor eNB from the eNB 200 to the other eNB. The detail of the anchor switch sequence is described later.

On the other hand, at step S112, the eNB 200 determines that the CoMP communication to be terminated and performs processing of terminating the CoMP communication (6) CoMP Cooperating Set Hereinafter, the CoMP cooperating set is described in the order of (6.1) CoMP Cooperating Set Setting Operation, (6.2) Anchor eNB Switch sequence, and (6.3) eNB Adding Sequence.

(6.1) CoMP Cooperating Set Setting Operation

When the CoMP cooperating set is formed by different eNBs, a band to be allocated to the UE has to be determined by negotiation among the eNBs. If the negotiation takes a long time due to transmission delay among the eNBs (i.e., transmission delay over the X2 interface), dynamic band allocation cannot be achieved. For this reason, in order to attain the dynamic band allocation, the pre sent embodiment employs the following configuration.

The eNB according to the present embodiment comprises an acquisition unit (the network communication unit 230 and the processor 241) that acquires transmission delay between itself and a neighboring eNB and a registration unit (the processor 241 and the memory 242) that registers the neighboring eNB as an eNB to be included in the CoMP cooperating set when the transmission delay acquired by the acquisition unit is smaller than a threshold. On the other hand, the registration unit excludes the neighboring eNB from eNBs to be included in the CoMP cooperating set when the transmission delay acquired by the acquisition unit is equal to or larger than the threshold.

In addition, even with the intension of forming the CoMP cooperating set by using different eNBs, not all the eNBs support all the CoMP types. On the other hand, the eNBs in the CoMP cooperating set have to use a common type of CoMP. For this reason, in order to easily form the CoMP cooperating set in which a common CoMP type is supported, the present embodiment employs the following configuration is used.

The eNB according to the present embodiment is an eNB supporting CoMP, and comprises a receiver (the network communication unit 230) that receives a notification of CoMP type supported by a neighboring eNB and a storage (the processor 241 and the memory 242) that stores information of the neighboring eNB in association with the CoMP type supported by the neighboring eNB based on the notification received by the receiver.

Figure 14:
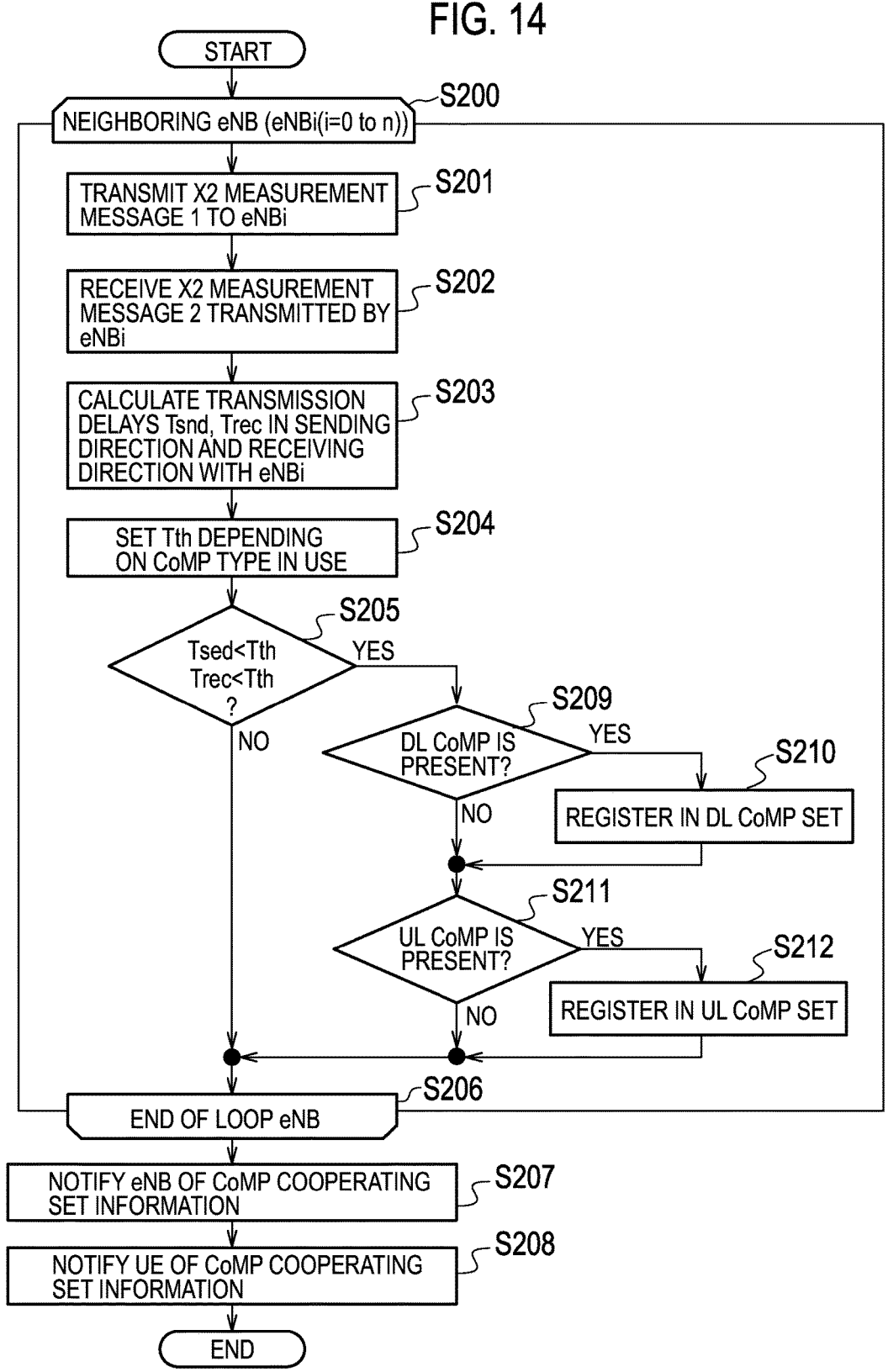
FIG. 14 illustrates a setting operation flow of a CoMP cooperating set.

FIG. 14 illustrates a setting operation flow of a CoMP cooperating set. The flow is periodically executed by the eNB 200 operating as an anchor eNB at the time of starting the CoMP communication. However, the flow may be periodically executed after the CoMP communication is started. FIG. 15 illustrates an X2 measurement message which is used in the flow.

As illustrated in FIG. 14, at step S200, the eNB 200 starts processing loop for each of other neighboring eNBs (neighboring eNB). The neighboring eNB may be an eNB whose identifier is included in a neighbor list set in the eNB 200 (i.e., a neighboring eNB) or may be an eNB having the X2 interface established with the eNB 200.

At step S201, the eNB 200 transmits an X2 measurement message 1 over the X2 interface to a neighboring eNBi (i=0 to n). Here, an initial value of "i" is 0 and 1 is added to each loop. Note that when "i" reaches "n", the loop is broken.

As illustrated in FIG. 15, the X2 measurement message contains time information (hereinafter, referred to as "time stamp T0") when the X2 measurement message 1 is transmitted.

The neighboring eNBi which has received the X2 measurement message 1 transmits an X2 measurement message 2 containing various pieces of information to be described later over the X2 interface.

At step S202, the eNB 200 receives the X2 measurement message 2 transmitted from the neighboring eNBi. The eNB 200 acquires time information (hereinafter, referred to as "time stamp T3") when the X2 measurement message 2 is received from the neighboring eNBi.

As illustrated in FIG. 15, the X2 measurement message 2 contains the time stamp T0 contained in the X2 measurement message received by the neighboring eNBi, time information (hereinafter, referred to as "time stamp T2") when the neighboring eNBi received the X2 measurement message 1, time information (hereinafter, referred to as "time stamp T1") when the neighboring eNBi transmitted the X2 measurement message 2, a type of downlink CoMP supported by the neighboring eNBi (hereinafter, referred to as "DL supporting CoMP type"), and a type of uplink CoMP supported by the neighboring eNBi (hereinafter, referred to as "UL supporting CoMP type"). FIG. 15 illustrates JT, DCS, CS, CB as types of DL CoMP supported by the neighboring eNBi. Also, JR and CS are illustrated as types of UL CoMP supported by the neighboring eNBi.

At step S203, the eNB 200 calculates transmission delay Tsnd in a direction from the eNB 200 to the neighboring eNBi (a transmission method) and transmission delay Trec in a direction from the neighboring eNBi to the eNB 200 (a reception method) based on the above-described time stamps T0 to T3. Specifically, the eNB 200 calculates a difference between the time stamp T0 contained in the X2 measurement message 2 and the time stamp T2 contained in the X2 measurement message 2 as the transmission delay Tsnd. Also, the eNB 200 calculates a difference between the time stamp T1 contained in the X2 measurement message 2 and the time stamp T3 acquired by itself as the transmission delay Trec.

At step S204, the eNB 200 sets a threshold Th according to the CoMP type (i.e., the CoMP type supported by the eNB 200) which is planned to be used by the eNB 200. For example, the JT, JR, DCS belonging to the JP type require high-speed communication among the respective eNBs included in the CoMP cooperating set. Accordingly, a threshold Th whose condition is strict is set. On the other hand, the CS and CB are not for simultaneously performing transmission or reception by plurality of eNBs, and thus do not require high-speed communication among the eNBs as compared with the case of the JP type. Accordingly, in order to increase the number of eNBs to be included in the CoMP cooperating set, a threshold Th whose condition is lax (i.e., a value larger than the threshold in the JP type) is set.

At step S205, the eNB 200 compares each of the transmission delay Tsnd and the transmission delay Trec calculated at step S203 with the threshold Th set at step S204. When both the transmission delay Tsnd and the transmission delay Trec are smaller than the threshold Th (step S205; Yes), processing proceeds to step S209, and if not, processing proceeds to step S206.

At step S209, the eNB 200 checks if the DL supporting CoMP type contained in the X2 measurement message 2 indicates "presence" of the DL supporting CoMP type (i.e., if the neighboring eNBi supports the downlink CoMP or not). When the neighboring eNBi supports the downlink CoMP (step S209; Yes), at step S210, the eNB 200 registers the neighboring eNBi as an eNB to be included in the downlink CoMP cooperating set.

Next, at step S211, the eNB 200 checks if the UL supporting CoMP type contained in the X2 measurement message 2 indicates "presence" of the UL supporting CoMP type (i.e., if the neighboring eNBi supports the uplink CoMP or not). When the neighboring eNBi supports the uplink CoMP (step S211; Yes), at step S212, the eNB 200 registers the neighboring eNBi as an eNB to be included in the uplink CoMP cooperating set.

At step S206, if it is determined that processing for all the neighboring eNBs is terminated, the loop is broken.

At step S207, the eNB 200 transmits CoMP cooperating set information on the CoMP cooperating set over the X2 interface to each of eNBs to be included in the CoMP cooperating set. The eNB having received the CoMP cooperating set information stores the received CoMP cooperating set information.

At step S208, the eNB 200 transmits the CoMP cooperating set information to the UE 100.

Note that although the details are described later, in a case where the eNB included in the CoMP cooperating set is changed (added, excluded or anchor eNB is changed) during the CoMP communication, or in a case where communication setting applied to the CoMP cooperating set is changed, the anchor eNB changes the CoMP cooperating set information and transmits the changed CoMP cooperating set information over the X2 interface. The eNB having received the changed CoMP cooperating set information updates the information to the changed CoMP cooperating set information.

FIG. 16 illustrates an example of the CoMP cooperating set information. The eNBs and UE performing CoMP communication stores the CoMP cooperating set information on the CoMP communication.

The example of FIG. 16 illustrates the CoMP cooperating set information on the CoMP cooperating set only performing the uplink CoMP communication, the CoMP cooperating set information on the CoMP cooperating set only performing the downlink CoMP communication, and the CoMP cooperating set information on the CoMP cooperating set performing both the uplink and downlink CoMP communication.

Assumed herein is a case where the eNB only performs the uplink CoMP communication with the UE 1, only performs the downlink CoMP communication with the UE 2, and performs both the uplink and downlink CoMP communication with the UE 3.

The CoMP cooperating set information contains C-RNTI (Cell-Radio Network Temporary Identity). The C-RNTI is a temporal UE identifier referred to as a cell specific radio network temporal identity. Although the details are described later, the C-RNTI may be changed when an eNB is to be added to the CoMP cooperating set. In this case, the CoMP cooperating set information contains each C-RNTI before and after the change.

The CoMP cooperating set information contains an eNB identifier (or a cell identifier) of each eNB included in the CoMP cooperating set and an eNB identifier (or a cell identifier) of an anchor eNB included in the CoMP cooperating set.

The CoMP cooperating set information contains a downlink HARQ first transmission allocation interval and uplink HARQ first transmission allocation interval. The details of the HARQ first transmission allocation interval are described later.

The CoMP cooperating set information contains resource block information (e.g., a resource block number) of E-PDCCH (Evolved-PDCCH). The details of the E-PDCCH are described later.

The CoMP cooperating set information contains information indicating timing allocated to the UE. The expression of "offset (SFN, subframe)" in FIG. 16 means to allocate timing when "Current Time (=SFN*10+subframe) modulo allocation interval"="offset (=SFN*10+subframe) modulo allocation interval" is fulfilled. As described above, the eNB 200 acquires the transmission delay between itself and the neighboring eNB. When the acquired transmission delay is smaller than a threshold, the neighboring eNB is registered as an eNB to be included in the CoMP cooperating set. Also, the neighboring eNB is excluded from eNBs to be included in the CoMP cooperating set when the acquired transmission delay is equal to or larger than the threshold. Accordingly, the neighboring eNB whose transmission delay is large over the X2 interface can be excluded from eNBs to be included in the CoMP cooperating set. Thus, dynamic band allocation can be achieved.

In the present embodiment, the eNB 200 registers the neighboring eNB as an eNB to be included in the CoMP cooperating set when the transmission delay Tsnd in the direction from the eNB 200 to the neighboring eNB (the transmitting direction) and the transmission delay Trec in the direction from the neighboring eNB to the eNB 200 (the receiving direction) are acquired and the both the transmission delay Tsnd and the transmission delay Trec are equal to or smaller than the threshold. Accordingly, the CoMP communication can be started after it is checked that the delay is small in both the transmitting direction and the receiving direction.

In the present embodiment, the eNB 200 sets a threshold to be compared with the transmission delay Tsnd and the transmission delay Trec according to the CoMP type to be used in the CoMP cooperating set. A required transmission delay condition can be met for each CoMP type.

In the present embodiment, the eNB 200 receives the notification of the CoMP type supported by the neighboring eNB and stores the neighboring eNB information based on the received notification in association with the CoMP type supported by the neighboring eNB. In particular, information pieces on neighboring eNBs supporting a same CoMP type are stored as a group. Accordingly, the eNB 200 can manage neighboring eNBs as groups on the supporting CoMP type basis. Thus, the CoMP cooperating set in which a common CoMP type is supported can be easily formed.

In the present embodiment, the CoMP cooperating set only performing the downlink CoMP, the CoMP cooperating set only performing the uplink CoMP, and the CoMP cooperating set performing both the uplink and downlink CoMP can be individually managed. Thus, one eNB can perform a plurality of types of CoMP communication. Also, the UE can have different CoMP cooperating sets among the CoMP cooperating set only performing the downlink CoMP, the CoMP cooperating set performing the uplink CoMP, and the CoMP cooperating set performing both the uplink and downlink CoMP.

(6.2) Anchor eNB Switch Sequence

Next, the anchor eNB switch sequence is described. In order to follow movement of UE, it is desirable that an anchor eNB is switched as needed among eNBs included in the CoMP cooperating set. In the present embodiment, the anchor eNB transmits, to another eNB included in the CoMP cooperating set, an anchor switch request for requesting the other eNB to be a new anchor eNB in the CoMP cooperating set based on a measurement report from the UE. If accepting the anchor switch request from the anchor eNB, the other eNB is switched to the new anchor eNB after transmitting positive acknowledgement in response to the anchor switch request to the anchor eNB, and then. After the other eNB is switched to the new anchor eNB, the other eNB notifies other eNBs included in the CoMP cooperating set that the other eNB itself becomes the new anchor eNB.

Figure 17:
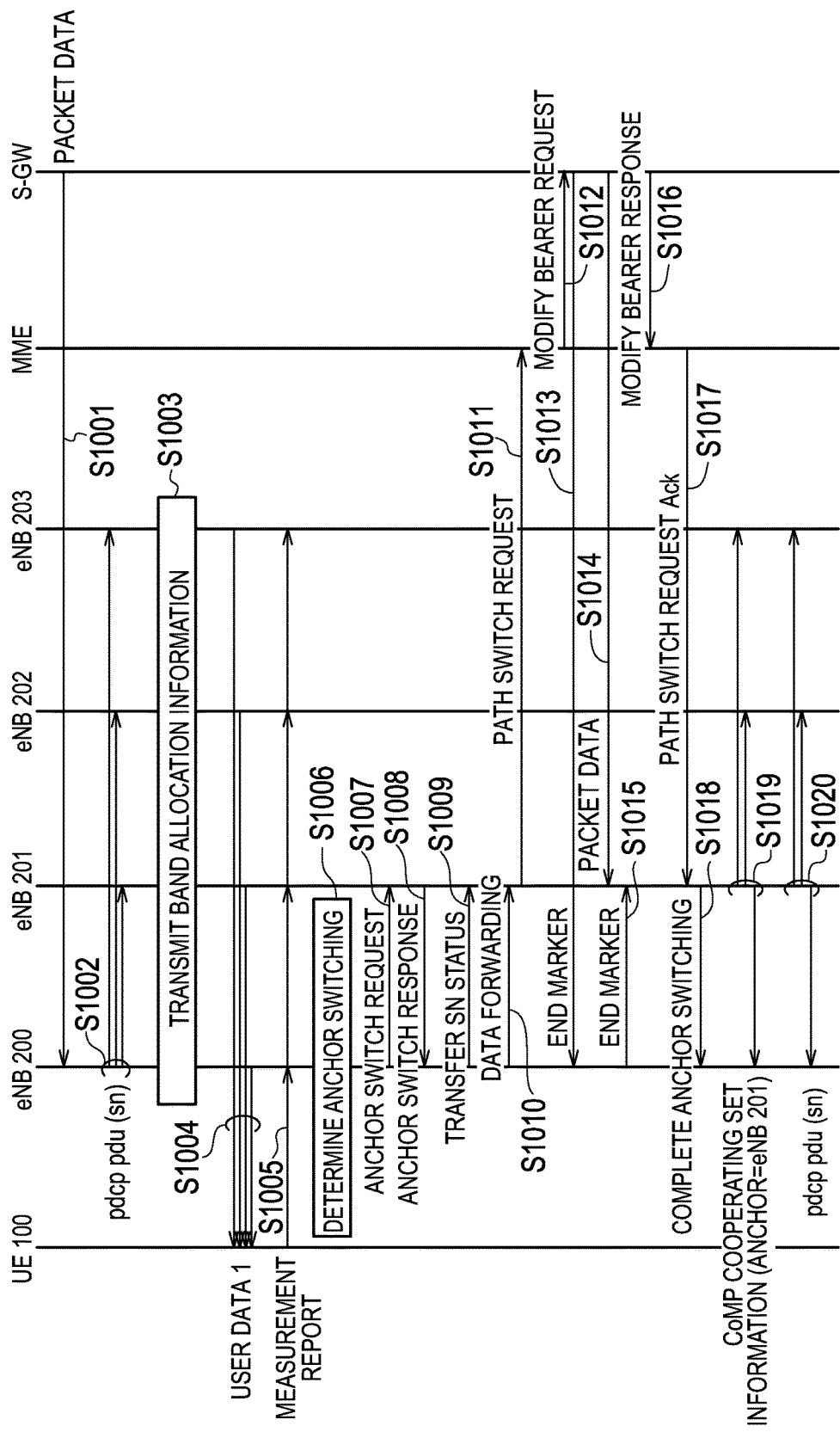
FIG. 17 illustrates an anchor eNB switch sequence.

FIG. 17 illustrates an anchor eNB switch sequence. Here, the description is given to an example in which an anchor eNB is switched from the eNB 200 to the eNB 201 while the CoMP cooperating set is formed by the eNB 200 to the eNB 203 and the UE 100 are executing the JT type CoMP.

As illustrated in FIG. 17, at step S1001, the eNB 200 receives packet data from the S-GW. Although the details are described later, the eNB 200 converts the packet data in the PDCP layer to PDCP PDU and adds a sequence number to the PDCP PDU.

At step S1002, the eNB 200 transfers the PDCP PDU to which the sequence number is added to the eNB 201 to the eNB 203 over the X2 interface.

At step S1003, each of the eNB 200 to the eNB 203 transmits/receives band allocation information on an allocation candidate band to/from another eNB included in the CoMP cooperating set over the X2 interface and determines a band to be allocated to the UE 100. The details of the band allocation information are described later.

At step S1004, each of the eNB 200 to the eNB 203 allocates the band determined at step S1003 to the UE 100 and transmits the same data to the UE 100.

At step S1005, the UE 100 transmits a measurement report. Each of the eNB 200 to the eNB 203 receives the measurement report.

At step S1006, the eNB 200 determines that the anchor eNB is to be switched to the eNB 201 based on the measurement report.

At step S1007, the eNB 200 transmits an anchor switch request for requesting the eNB 201 to be a new anchor eNB to the eNB 201 over the X2 interface.

At step S1008, the eNB 201 determines that the anchor switch request from the eNB 200 is accepted, and transmits an anchor switch response indicating that to the eNB 200 over the X2 interface.

At step S1009, the eNB 200 transmits an SN Status transfer message indicating a state of transmission/reception with the UE 100 to the eNB 201 over the X2 interface in order to forward unsent data to the UE 100.

At step S1010, the eNB 200 forwards (forwarding) the data unsent to the UE 100 to the eNB 201 over the X2 interface.

At step S1011, the eNB 201 transmits a path switch request for switching a data path (path) to the eNB 201 to MME on the S1 interface.

At step S1012, the MME transmits a bearer change request to the S-GW in response to the path switch request from the eNB 201. The S-GW starts processing of switching the data path from the eNB 200 to the eNB 201 in response to the bearer change request from the MME.

At step S1013, the S-GW transmits End Marker indicating that data transfer to the eNB 200 is terminated to the eNB 200 on the S1 interface.

At step S1014, the S-GW transmits packet data to the eNB 201 on the S1 interface.

At step S1015, the eNB 200 transmits End Marker indicating that data transfer (forwarding) to the eNB 201 is terminated to the eNB 201 over the X2 interface.

At step S1016, the S-GW transmits a bearer changing response which is a response to the bearer change request received at step S1012 to the MME.

At step S1017, the MME transmits a path switch response which is a response to the path switch request received at step S1011 to the eNB 201 on the S1 interface.

At step S1018, the eNB 201 notifies the eNB 200 over the X2 interface that the switching of the anchor eNB is completed. After that, the eNB 201 operates as a new anchor eNB. The eNB 201 switched to the new anchor eNB updates the CoMP cooperating set information stored in the eNB 201 such that the eNB 201 itself is set as the anchor eNB.

At step S1019, the eNB 201 transmits the updated CoMP cooperating set information to the eNB 200, the eNB 202, and the eNB 203 over the X2 interface. Furthermore, the eNB 201 may notify the UE of the updated CoMP cooperating set information. The eNB 200, the eNB 202, and the eNB 203 store the updated CoMP cooperating set information when the updated CoMP cooperating set information is received.

At step S1020, the eNB 201 transfers the PDCP PDU obtained after the packet data received from the S-GW at step S1014 is converted to the eNB 200, the eNB 202, and the eNB 203 over the X2 interface.

As described above, the eNB 200 transmits an anchor switch request for requesting another eNB 201 included in the CoMP cooperating set to be a new anchor eNB in the CoMP cooperating set based on a measurement report from the UE. If accepting the anchor switch request from the eNB 200, the eNB 201 transmits an anchor switch response which is acknowledgement responding to the anchor switch request to the eNB 200 and then is switched to a new anchor eNB. Accordingly, the anchor eNB can be switched without stopping the CoMP communication.

In the present embodiment, after the eNB 201 is switched to a new anchor eNB, the eNB 201 notifies the eNB 200, the eNB 202, and the eNB 203 that the eNB 201 is the new anchor eNB. Accordingly, even if an anchor eNB is switched during the CoMP communication, each eNB included in the CoMP cooperating set can know the new anchor eNB.

(6.3) eNB Adding Sequence

When the CoMP cooperating set is formed by different eNBs, it is desirable to add a new eNB as needed to the CoMP cooperating set in order to deal with the movement of the UE. However, assumed is a case where the new eNB has already been using the C-RNTI to be used in the CoMP cooperating set. The C-RNTI is needed for controlling radio communication with the UE. Since the same C-RNTI cannot be allocated to a plurality of UEs in the same eNB (the same cell), it is difficult to add the new eNB to the CoMP cooperating set.

For this reason, in the present embodiment, to add a new eNB to the CoMP cooperating set, the anchor eNB transmits, to another eNB which is not included in the CoMP cooperating set, a CoMP adding request for requesting the other eNB to be added to the CoMP cooperating set. Also, when the CoMP adding request is transmitted, the C-RNTI being used for communication with the UE is transmitted to the other eNB.

Note that when an eNB is added, it is preferable that the CoMP cooperating set setting operation described in (6.1) be performed, but the description of the operation is omitted in the following sequence.

(6.3.1) eNB Adding Pattern 1

Figure 18:
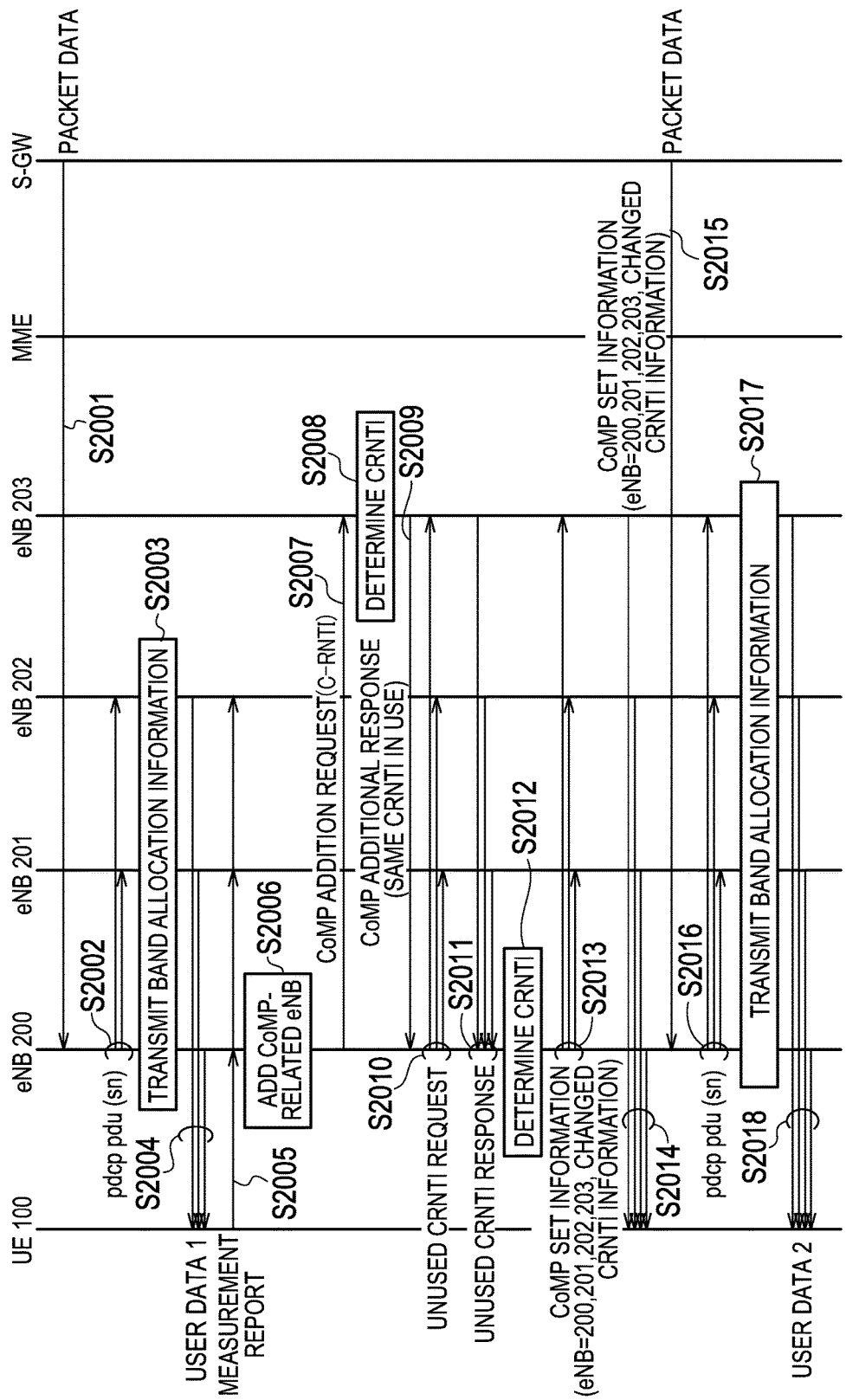
FIG. 18 illustrates pattern 1 of an eNB adding sequence.

FIG. 18 illustrates a pattern 1 of an eNB adding sequence. Here, the description is given to an example in which the eNB 203 is added to the CoMP cooperating set while the CoMP cooperating set formed by the eNB 200 to the eNB 202 and the UE 100 are executing the JT type CoMP. Also, the eNB 203 allocates C-RNTI same as the C-RNTI allocated to the UE 100 to the UE connected with the eNB 203.

As illustrated in FIG. 18, at step S2001, the eNB 200 operating as an anchor eNB receives packet data from the S-GW. Although the eNB 200 converts the packet data in the PDCP layer to PDCP PDU and adds a sequence number to the PDCP PDU.

At step S2002, the eNB 200 transfers the PDCP PDU to which the sequence number is added to the eNB 201 and the eNB 202 over the X2 interface.

At step S2003, each of the eNB 200 to the eNB 202 transmits/receives band allocation information on an allocation candidate band to/from another eNB included in the CoMP cooperating set over the X2 interface and determines a band to be allocated to the UE 100.

At step S2004, each of the eNB 200 to the eNB 202 allocates the band determined at step S2003 to the UE 100 and transmits the same data to the UE 100.

At step S2005, the UE 100 transmits a measurement report. Each of the eNB 200 to the eNB 202 receives a measurement report.

At step S2006, the eNB 200 determines based on the measurement report that the eNB 203 is added to the CoMP cooperating set. For example, the eNB 200 determines that the eNB is added to the CoMP cooperating set when the measurement report received at this time contains a signal level about eNB (cell) which is not contained until the previous measurement report and the signal level has a value suitable for the CoMP communication.

At step S2007, the eNB 200 transmits a CoMP adding request for requesting to be added to the CoMP cooperating set over the X2 interface. The eNB 200 transmits C-RNTI which is being used for the CoMP communication with the UE 100 with the C-RNTI contained in the CoMP adding request.

At step S2008, the eNB 203 determines based on the CoMP adding request received from the eNB 200 if C-RNTI same as the C-RNTI which is being used in the CoMP cooperating set to which the eNB 200 belongs is used. Specifically, the eNB 203 determines if the C-RNTI contained in the received CoMP adding request meets with any of the C-RNTIs which are being used in the eNBs (already allocated). Here, the eNB 203 determines that the same C-RNTI is used.

At step S2009, the eNB 203 transmits, to the eNB 200, a CoMP adding response which is a response to the CoMP adding request over the X2 interface. The eNB 203 transmits information indicating that the same C-RNTI is being used with the information being contained in the CoMP adding response.

At step S2010, the eNB 200 transmits an unused C-RNTI request for requesting to notify an unused (not-allocated) C-RNTI of the eNB 201 to the eNB 203 over the X2 interface in response to the fact that information indicating that the same C-RNTI is being used is contained in the CoMP adding response.

At step S2011, each of the eNB 201 to the eNB 203 extracts C-RNTI which is unused in the eNB itself in response to the unused C-RNTI request and transmits the unused C-RNTI response including the C-RNTI unused in the eNB itself to the eNB 200 over the X2 interface.

At step S2012, the eNB 200 selects a common C-RNTI among the C-RNTI unused in the eNB 200 and an unused C-RNTI contained in the unused C-RNTI response (C-RNTI unused in each of the eNB 201 to the eNB 203) and the selected C-RNTI is determined as a new C-RNTI to be used for the CoMP communication with the UE 100.

Here, if there is no common C-RNTI, it is only needed that the eNB 200 selects an eNB to be excluded from the CoMP cooperating set based on the measurement report from the UE 100 and a common C-RNTI is selected among C-RNTI unused in each of the remaining eNBs.

The eNB 200 determining the new C-RNTI updates the CoMP cooperating set information stored in the eNB 200 so that the new C-RNTI is included and also that the eNB 203 is added to the CoMP cooperating set.

At step S2013, the eNB 200 transmits the updated CoMP cooperating set information to the eNB 201 to the eNB 203 over the X2 interface. The eNB 201 to the eNB 203 store the updated CoMP cooperating set information when the updated CoMP cooperating set information is received.

At step S2014, the eNB 200 to the eNB 203 transmit the updated CoMP cooperating set information to the UE 100. The UE 100 recognizes that the changed C-RNTI contained in the updated CoMP cooperating set information is allocated and uses the changed C-RNTI hereinafter.

At step S2015, the eNB 200 receives packet data from the S-GW.

At step S2016, the eNB 200 transfers the PDCP PDU to the eNB 201 to the eNB 203 over the X2 interface.

At step S2017, each of the eNB 200 to the eNB 203 transmits/receives band allocation information on an allocation candidate band to/from another eNB included in the CoMP cooperating set over the X2 interface and determines a band to be allocated to the UE 100.

At step S2018, each of the eNB 200 to the eNB 202 allocates the band determined at step S2017 to the UE 100 and transmits the same data to the UE 100.

Although an example in which the eNB 203 is using the same RNTI (already allocated) is described in the present sequence, but if the eNB 203 is not using the same C-RNTI, step S2010 to step S2012 are not performed.

In this manner, the eNB 200 transmits C-RNTI which is being used for the CoMP communication with the UE 100 to the eNB 203 which is not included in the CoMP cooperating set with the C-RNTI being contained in the CoMP adding request. The eNB 203 notifies the eNB 200 whether the C-RNTI contained in the CoMP adding request is being used after the CoMP adding request from the eNB 200 is received. The eNB 200 request the eNB 201 to the eNB 203 to give notice of the unused C-RNTI if the eNB 203 is using the same C-RNTI. The eNB 201 to the eNB 203 notifies the eNB 200 of the C-RNTI unused in the eNB itself in response to the request from the eNB 200. The eNB 200 determines a new C-RNTI which is a common C-RNTI among the C-RNTI unused in the eNB 200 to the eNB 203 is used for the CoMP communication in response to the notification from the eNB 201 to the eNB 203. Accordingly, the eNB 203 which has been already using the C-RNTI to be used for the CoMP cooperating set can be added to the CoMP cooperating set.

The eNB 200 notifies another eNB included in the CoMP cooperating set of the C-RNTI to be newly used after determining the newly-used C-RNTI. Accordingly, even if C-RNTI is changed during the CoMP communication, each eNB included in the CoMP cooperating set can know the new C-RNTI (6.3.2) eNB Adding Pattern 2

Figure 19:
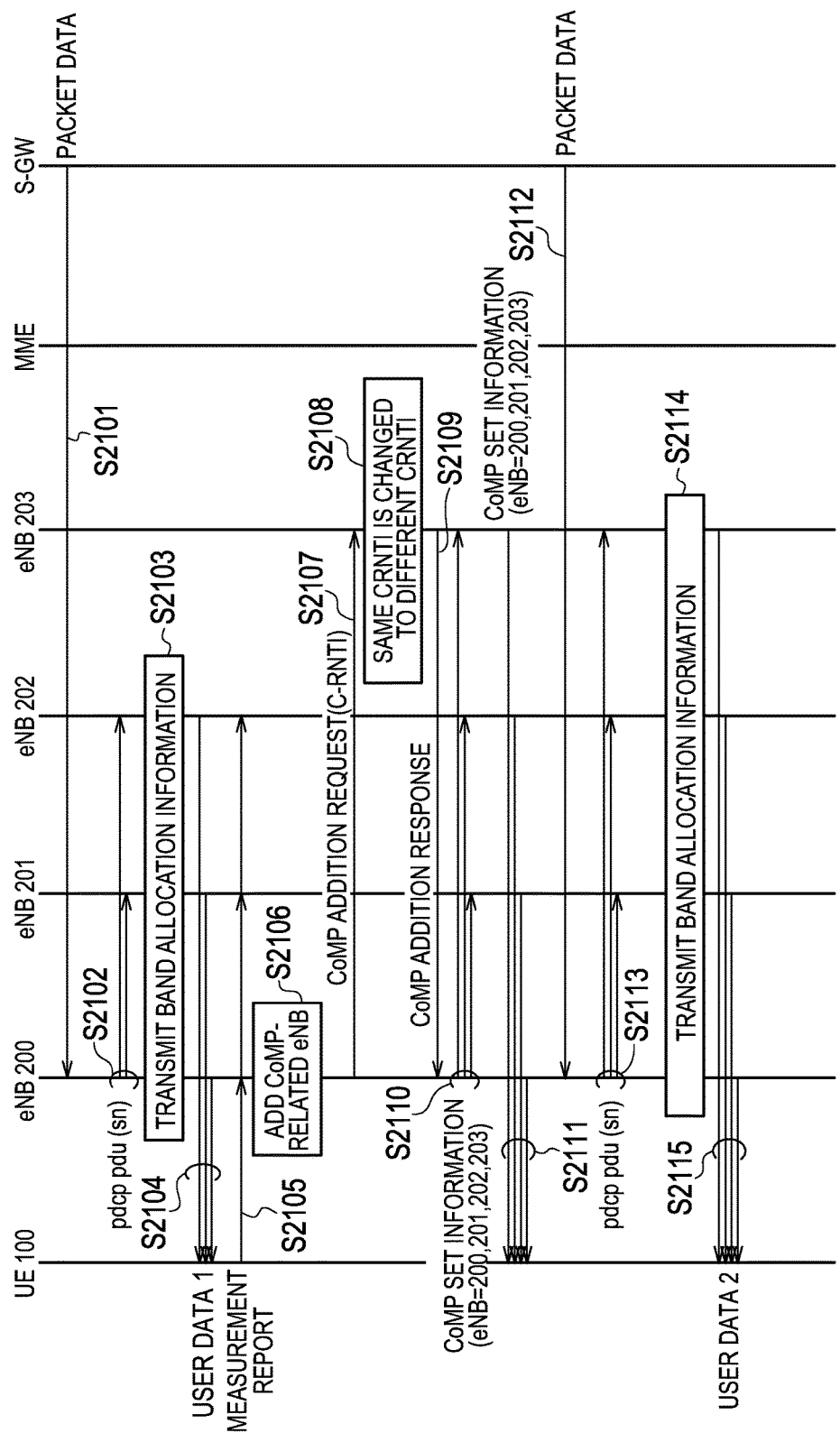
FIG. 19 illustrates pattern 2 of an eNB adding sequence.

FIG. 19 illustrates a pattern 2 of an eNB adding sequence. An initial state of the present pattern is same as the above-described operation pattern 1. In addition, step S2101 to step S2105 in FIG. 19 are same as the above-described step S2001 to step S2005. Thus, the description thereof is omitted.

As illustrated in FIG. 19, at step S2106, the eNB 200 determines based on the measurement report that the eNB 203 is added to the CoMP cooperating set.

At step S2107, the eNB 200 transmits a CoMP adding request for requesting to be added to the CoMP cooperating set over the X2 interface. The eNB 200 transmits C-RNTI which is being used for the CoMP communication with the UE 100 with the C-RNTI contained in the CoMP adding request.

At step S2108, the eNB 203 determines based on the CoMP adding request received from the eNB 200 if C-RNTI same as the C-RNTI which is being used in the CoMP cooperating set to which the eNB 200 belongs is used. Then, the eNB 203 changes the same C-RNTI to another C-RNTI when it is determined that the same C-RNTI is being used.

At step S2109, the eNB 203 transmits, to the eNB 200, a CoMP adding response which is a response to the CoMP adding request over the X2 interface.

The eNB 200 having received the CoMP adding request updates the CoMP cooperating set stored in the eNB 200 so that the eNB 203 is added to the CoMP cooperating set.

At step S2110, the eNB 200 transmits the updated CoMP cooperating set information to the eNB 201 to the eNB 203 over the X2 interface. The eNB 201 to the eNB 203 store the updated CoMP cooperating set information when the updated CoMP cooperating set information is received.

At step S2111, the eNB 200 to the eNB 203 transmit the updated CoMP cooperating set information to the UE 100.

The sequence hereinafter is same as the above-described pattern 1.

In this manner, the eNB 200 transmits C-RNTI which is being used for the CoMP communication with the UE 100 to the eNB 203 which is not included in the CoMP cooperating set with the C-RNTI being contained in the CoMP adding request. The eNB 203 changes the same C-RNTI to another C-RNTI in a case where the C-RNTI same as the C-RNTI contained in the CoMP adding request us being used when the CoMP adding request from the eNB 200 is received. Accordingly, the eNB 203 which has been already using the C-RNTI to be used for the CoMP cooperating set can be added to the CoMP cooperating set.

(7) CoMP Communication Control

Hereinafter, CoMP communication control is described in the order of (7.1) E-PDCCH, (7.2) Band Allocation Control and Timing Advance Control, and (7.3) Data Synchronization and Retransmission Control.

(7.1) E-PDCCH

In general, UE receives downlink control information (DCI) which is transmitted from eNB on PDCCH and performs communication based on SI (Scheduling Information) or the like which is resource allocation information contained in the DCI. Here, a time-frequency resource (PDCCH resource) to be used as PDCCH changes according to a communication state between eNB and UE.

However, if a CoMP cooperating set is formed by different eNBs, each eNB included in the CoMP cooperating set individually performs PDCCH resource allocation to the UE. Thus, it is difficult to allocate the same PDCCH resource to the UE and apply JT type CoMP to the PDCCH domain (control domain). Also, when each eNB included in the CoMP cooperating set allocates the PDCCH resource to the UE, the consumption of the PDCCH resource is large. For these reasons, the present embodiment uses the following configuration to properly transmit DCI even when the CoMP communication is performed.

The LTE system 1 according to the present embodiment performs communication using the downlink frame configuration including the control domain for transmitting DCI and the data domain for transmitting downlink user data. Each of the plurality of eNBs performing the CoMP communication with the UE comprises a transmission unit (the processor 241 and the radio transceiver 220) that transmits the DCI by using the date domain in place of the control domain, when the CoMP communication is performed with the UE.

Note that DCI contains uplink SI (Scheduling Information) and downlink SI. Furthermore, the DCI may contain additional information for the CoMP. The uplink SI indicates an uplink allocation resource block and an allocation MCS. The downlink SI indicates a downlink allocation resource block and an allocation MCS.

Figure 20:
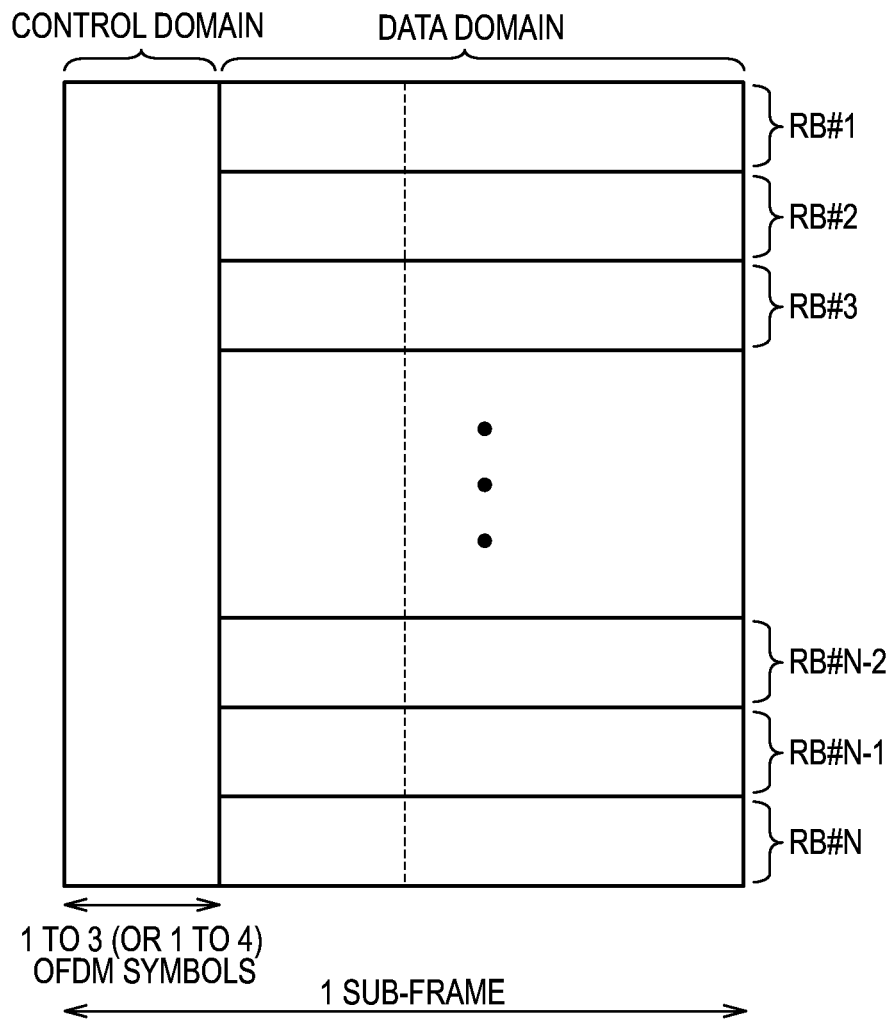
FIG. 20 illustrates a downlink sub-frame configuration.

FIG. 20 illustrates a downlink sub-frame configuration.

As illustrated in FIG. 20, the downlink sub-frame includes two continuous downlink slots. A section of maximum 3 (or 4) OFDM symbols from the head of the first half slots within the downlink sub-frame is a control domain including time-frequency resources to be mainly used as PDCCH. The remaining OFDM symbol section of the downlink sub-frame is a data domain including time-frequency resources to be mainly used as PDSCH.

In the present embodiment, the eNB transmits DCI in the data domain in place of the control domain when CoMP communication with the UE is performed. Also, the eNB transmits DCI using a specific resource block (RB) in the data domain when the DCI is transmitted in the data domain. In this manner, the specific resource block in the data domain is used for transmitting the DCI as similar to the PDCCH.

Such new PDCCH is referred to as "E-PDCCH (Evolved-PDCCH)". As described above, each eNB included in the CoMP cooperating set uses same resource block as the E-PDCCH. In the present embodiment, the resource block to be used as the E-PDCCH is determined by an anchor eNB.

However, the DCI is originally information to notify the UE of a resource block allocated to the data domain. Thus, if the DCI is transmitted in the data domain, the UE cannot be notified of the resource block allocated to the data domain.

For this reason, the eNB transmits information indicating the resource block to be used as the E-PDCCH by broadcasting. For example, information indicating the resource block used as the E-PDCCH can be included in a system information block (SIB) which is mapped in 6 resource blocks in the center of the downlink bandwidth.

Instead, when notifying the UE of the CoMP cooperating set information, the eNB may notify the UE of the information indicating the resource block (fixed) used as the E-PDCCH, which is included in the CoMP cooperating set information.

Furthermore, since a data amount of the DCI is smaller than that of user data, transmission of DCI only for one UE in one resource block leads to a waste of resource. For this reason, the eNB allocates one resource block for the plurality of UEs for the E-PDCCH and performs code division multiplex by coding multiple DICs for the plurality of UEs with different spread codes. Accordingly, a resource utilization efficiency can be improved.

On the other hand, the UE receives the SIB or the CoMP cooperating set information to specify the resource block for the E-PDCCH allocated to the UE itself and thereafter receives DCI transmitted by the E-PDCCH. Here, the DCI is coded with the spread code for the UE. The UE can be also notified of the spread code for the UE through the SIB or the CoMP cooperating set information, as similar to the allocation information of the E-PDCCH.

The UE comprises a receiver (the radio transceiver 120) that receives the coded DCI and a decoder (the processor 131) that decodes the DCI received by the receiver by using a spread code for the UE itself, and when the decoding succeeds, the decoder recognizes the decoded DCI as DCI addressed to the UE itself.

As described above, each of the plurality of eNBs performing the CoMP communication with the UE transmits the DCI in the data domain in place of the control domain when the CoMP communication with the UE are performed, so that the DCI can be properly transmitted even when the CoMP communication is performed.

(7.2) Band Allocation Control and Timing Advance Control (7.2.1) Band Allocation Control As described above, when the CoMP cooperating set is formed by different eNBs, a band to be allocated to the UE has to be determined by negotiation among the eNBs. Here, the band means a frequency resource (a resource block), a time resource (sub-frame), and a modulation scheme (MCS).

In addition, the band is not a band for the DCI (a band of the E-PDCCH) but a band for transmitting user data (a band of PDSCH and/or a band of PUSCH).

If negotiation between eNBs requires a long time due to the transmission delay between the eNBs, a proper band allocation cannot be performed. For this reason, in the present embodiment, the following configuration is used to shorten time required for determining a band to be allocated to the UE in the CoMP.

In the present embodiment, each of a plurality of eNBs included in the CoMP cooperating set comprises a notification unit (the network communication unit 230 and the processor 241) that notifies other eNBs included in the CoMP cooperating set of an allocation candidate band for UE in the eNB itself, a receiver (the network communication unit 230) that receives a notification of an allocation candidate band for the UE in the other eNB from the other eNB included in the CoMP cooperating set, and a selector (the processor 241) that selects a band to be allocated to the UE from allocation candidate bands in the plurality of eNBs, based on the notification received by the receiver.

The selector selects a band to be allocated to the UE from allocation candidate bands in the plurality of eNBs, according to a selection rule common to the plurality of eNBs. In this manner, each eNB included in the CoMP cooperating set notifies other eNBs of an allocation candidate band to the other eNBs and selects a band to be allocated to the UE, according to the predetermined selection rules, from these allocation candidate bands. Accordingly, the band can be determined only by one-sided notification. Thus, time required for determining a band can be shortened.

As the common selection rule, any of the following selection rules 1, 2 can be used.

Selection rule 1: The notification unit creates a timing advance value to adjust transmission timing of UE and notifies the other eNBs included in the CoMP cooperating set of the created timing advance value. The receiver receives a timing advance value created in other eNBs included in the CoMP cooperating set from the other eNBs. In the selection rule 1, the common selections rule is a rule that an allocation candidate band in the eNB that creates a timing advance value causing the longest delay in the transmission timing of UE (i.e., the smallest timing advance value) among the plurality of eNBs is selected as a band to be allocated to the UE. The timing advance value causing the longest delay in the transmission timing of UE is selected as a timing advance value that the UE is to be notified, as described later. Accordingly, the selection rule 1 is a selection rule based on a timing advance value.

Selection rule 2: The notification unit selects MCS to be applied by the eNB to the UE and notifies other eNBs included in the CoMP cooperating set of the selected MCS. The receiver receives the MCS between the other eNB included in the CoMP cooperating set and the UE from the other eNB. In the selection rule 2, the common selection rule is a rule that an allocation candidate band in the eNB having selected the MCS whose transmission rate is the highest (i.e., MCS with low error resistance) among a plurality of eNBs is selected as a band to be allocated to the UE. The CoMP communication is expected to improve the UE communication quality, and thus a UE throughput can be increased by selecting the MCS whose transmission rate is high.

Furthermore, a selection rule may be a selection rule that an allocation candidate band in eNB whose number of resource block of the allocation candidate is the smallest among the plurality of eNBs can be selected as a band to be allocated to the UE.

FIG. 21 illustrates a state where each eNB included in a CoMP cooperating set notifies other eNBs of an allocation candidate band.

As illustrated in FIG. 21, each of the eNB 200 to the eNB 204 included in the CoMP cooperating set transmits band allocation information indicating the allocation candidate band to all eNBs other than the eNB itself in the CoMP cooperating set over the X2 interface. Each of the eNB 200 to the eNB 204 receives the band allocation information from all the eNBs other than the eNB in the CoMP cooperating set. Then, each of the eNB 200 to the eNB 204 selects a band to be allocated to the UE among the allocation candidate band in the eNB and the allocation candidate bands in the other eNBs according to the above-described selection rules.

FIG. 22 shows an example of band al location information.

As illustrated in FIG. 22, the band allocation information includes an identifier of UE to be a target, an identifier of transmission source eNB, an allocation candidate time (transmission scheduling time), an allocation candidate resource block, an allocation candidate modulation scheme (MCS), an identifier of transmission target data, and a timing advance value.

The identifier of UE to be a target is the above-described C-RNTI. The identifier of transmission source eNB is an identifier of eNB having transmitted the band allocation information. The allocation candidate time (timing) indicates a sub-frame of the allocation candidate in the transmission source eNB and is expressed by, for example, a sub-frame number. Instead, the allocation candidate time (timing) is expressed by SFN+sub-frame number. The allocation candidate resource block indicates a resource block of the allocation candidate in the transmission source eNB and is expressed by, for example, a resource block number.

The identifier of the transmission target data is for securing identify (for synchronization) of transmission data between eNBs and is a sequence number of PDCD PDU in the present embodiment. The sequence number of the PDCD PDU is added by an anchor eNB. The detail of processing of adding the sequence number to the PDCD PDU is described later.

The timing advance value is a timing advance value created in the transmission source eNB.

Figure 23:
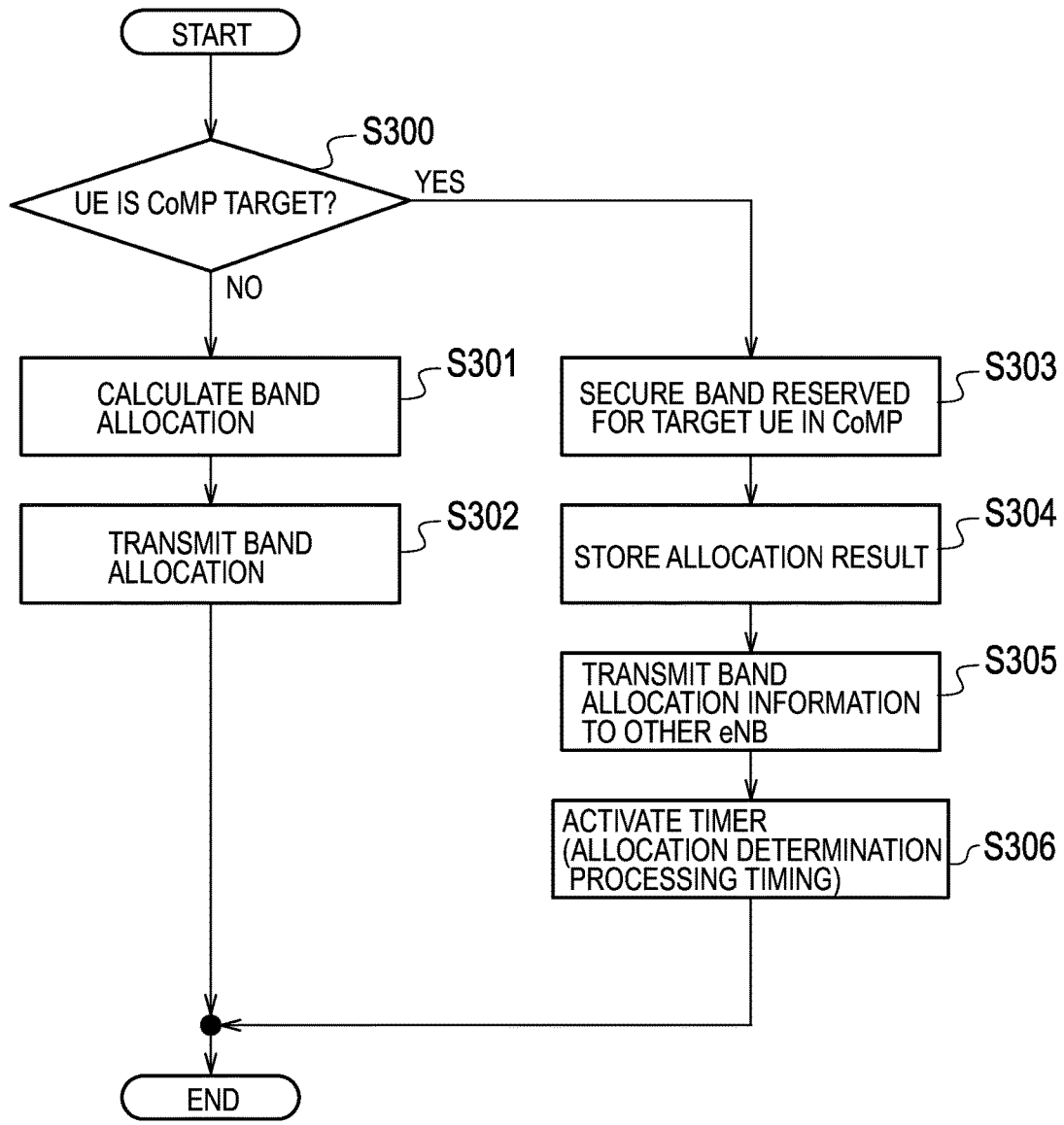
FIG. 23 illustrates an example of band allocation processing.

FIG. 23 illustrates one example of the band allocation processing in the eNB included in the CoMP cooperating set.

As illustrated in FIG. 23, at step S300, the eNB checks if the UE is a CoMP target. If the UE is the CoMP target (step S300; Yes), processing proceeds to step S303, and if not (step S300; No), processing proceeds to step S301.

At step S301, the eNB performs calculation for determining a band to be allocated to the UE. As for UE which is not a target for CoMP, based on CQI and/or SRS transmitted from the UE, an allocation band is determined according to a regular scheduling algorithm such as proportional fairness (PF).

At step S302, the eNB transmits DCI indicating the band determined at step S301 to the UE on the PDCCH.

On the other hand, at step S303, the eNB secures a reserved band (allocation candidate band) of the UE for CoMP in order to prioritize the band allocation to the UE which is a target for CoMP.

At step S304, the eNB stores the result at step S303.

At step S305, the eNB transmits the band allocation information (see FIG. 22) indicating the band secured for the UE at step S302 (i.e., the allocation candidate band) to another eNB included in the CoMP cooperating set which performs the CoMP communication with the UE over the X2 interface.

At step S306, the eNB activates a timer to time until the timing of the band allocation determination processing.

Figure 24:
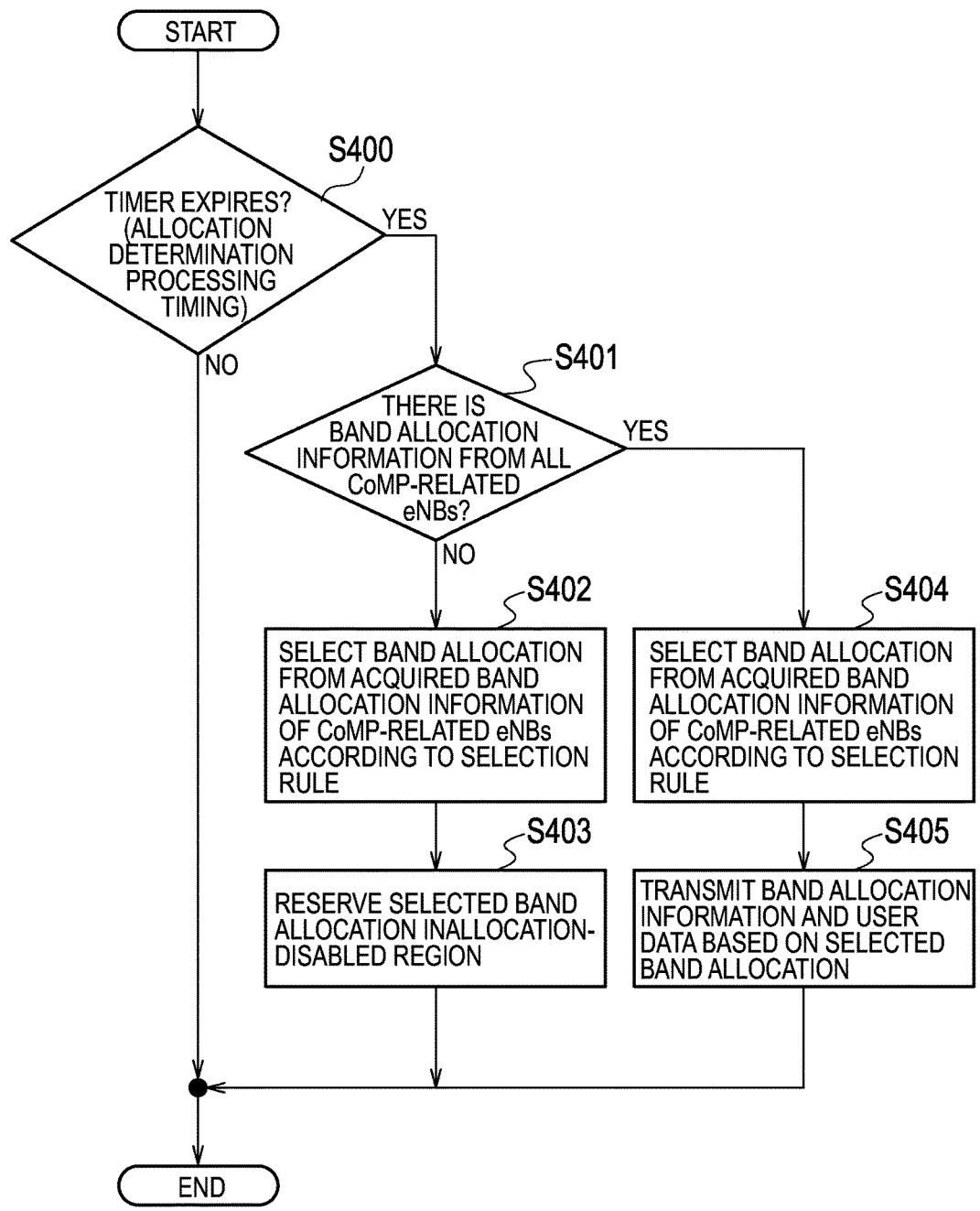
FIG. 24 illustrates an example of band allocation processing.

FIG. 24 shows an example of band allocation determination processing.

As illustrated in FIG. 24, at step S400, the eNB checks if the timer activated at step S306 expires. If the timer expires (step S400; Yes), processing proceeds to step S401.

At step S401, the eNB checks if band allocation information from all the other eNBs included in the CoMP cooperating set which performs CoMP communication with the UE is received. If the band allocation information is received from all the other eNBs (step S401; Yes), processing proceeds to step S404, and if not (step S401; No), processing proceeds to step S402.

At step S404, the eNB determines an allocation band to the UE from the allocation candidate band stored at step S304 and the allocation candidate bands for the other eNBs included in the CoMP cooperating set according to the above-described selection rules.

At step S405, the eNB transmits DCI indicating the allocation band determined at step S404 to the UE on the E-PDCCH and also transmits (or receives) the user data to (or from) the UE using the allocation band.

On the other hand, at step S402, the eNB times out without receiving the band allocation information from at least one of the other eNBs included in the CoMP cooperating set. The eNB determines a band from the allocation candidate band stored at step S304 and the allocation candidate band indicated by the received band allocation information according to the above-described selection rules. Here, since the band allocation information is not received from at least one of the other eNBs included in the CoMP cooperating set, a band different from the band to be used in common in the CoMP cooperating set might be selected.

At step S403, the eNB reserves the band determined at step S402 as an allocation-disabled band and stops transmission (or reception) of user data using the band. This can prevent adverse effects of data transmission (or reception) in the band different from the band to be used in common n the CoMP cooperating set.

Figure 25:
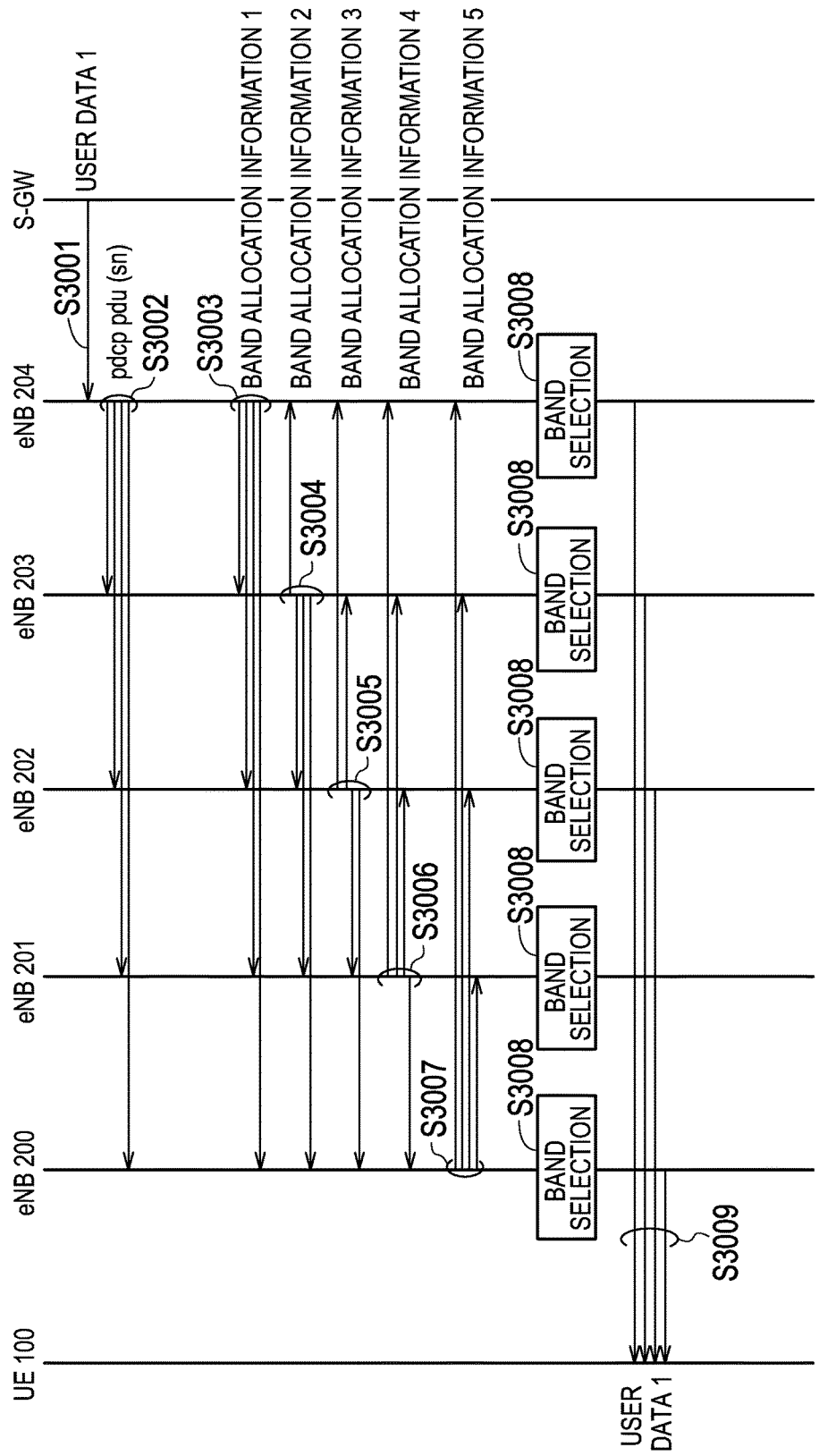
FIG. 25 illustrates a JT-type CoMP sequence.

FIG. 25 illustrates a JT-type CoMP sequence. Here, the description is given to an example in which the CoMP cooperating set formed by the eNB 200 to the eNB 204 and the UE 100 are executing the JT type CoMP and the eNB 204 operates as an anchor eNB.

As illustrated in FIG. 25, at step S3001, the eNB 204 operating as an anchor eNB receives packet data (user data) from the S-GW.

At step S3002, the eNB 204 converts the packet data in the PDCP layer to PDCP PDU with a sequence number and transfers the PDCP PDU to the eNB 200 to the eNB 203 over the X2 interface.

At step S3003, the eNB 204 creates band allocation information 1 and transfers the created band allocation information 1 to the eNB 200 to the eNB 203 over the X2 interface.

At step S3004, the eNB 203 creates band allocation information 2 and transfers the created band allocation information 2 to the eNB 200, eNB 201, eNB 202 and eNB 204 over the X2 interface.

At step S3005, the eNB 202 creates band allocation information 3 and transfers the created band allocation information 3 to the eNB 200, eNB 201, eNB 203 and eNB 204 over the X2 interface.

At step S3006, the eNB 201 creates band allocation information 4 and transfers the created band allocation information 4 to the eNB 200, eNB 202, eNB 203 and eNB 204 over the X2 interface.

At step S3007, the eNB 200 creates band allocation information 5 and transfers the created band allocation information 5 to the eNB 201 to the eNB 204 over the X2 interface.

At step S3008, each of the eNB 200 to the eNB 204 determines a band to be allocated to the UE 100 based on the band allocation information of the eNB itself and the band allocation information from the other eNBs.

At step S3009, each of the eNB 200 to the eNB 204 transmits the user data to the UE 100 in the allocation band determined at step S3008.

As described above, each eNB included in the CoMP cooperating set notifies other eNBs of an allocation candidate band and selects a band to be allocated to the UE according to the predetermined selection rule among these allocation candidate bands. Thus, time required for determining the band can be shortened.

Also, in the present embodiment, each of a plurality of eNBs has a notification unit (the network communication unit 230 and the processor 241) that notifies other eNBs included in the CoMP cooperating set of an allocation candidate band for UE in the eNB itself, a receiver (the network communication unit 230) that receives a notification of the allocation candidate band for the UE in the other eNB from the other eNB included in the CoMP cooperating set, and a disabling unit (the processor 241) that performs setting to disable allocation of allocation candidate band depending on a reception state of the receiver. When the receiver does not receive the notification from at least one of the other eNBs included in the CoMP cooperating set, the disabling unit performs setting to disable the allocation of the allocation candidate band recognized by the eNB itself among the allocation candidate bands in the plurality of eNBs. Each of the plurality of eNBs further comprises a selector (the processor 241) selects a band to be allocated to the UE among the allocation candidate bands in the plurality of eNBs according to the selection rule common to the plurality of eNBs. The disabling unit performs setting to disable allocation of the allocation candidate band selected according to the selection rule.

Accordingly, when the band allocation information is transmitted/received between the base stations included in the CoMP cooperating set, part of eNBs in the CoMP cooperating set is prevented from performing wrong allocation to the UE, even though the band allocation information is not normally transmitted/received due to congestion between the eNBs.

(7.2.2) Timing Advance Control

When a plurality of eNBs receive same data from UE n the JR-type CoMP, a proper timing advance value differs depends on each eNB. For this reason, it is difficult that the timing advance value is properly set. For this reason, in the present embodiment, the following configuration is used to properly set the timing advance value.

In the present embodiment, each of the eNBs included in the CoMP cooperating set comprises a transmission unit (the processor 241 and the network communication unit 230) that creates a timing advance value for adjusting data transmission timing of UE and transmits the created timing advance value to other eNBs included in the CoMP cooperating set, a receiver (the network communication unit 230) that receives a timing advance value created in the other eNB from the other eNB included in the CoMP cooperating set, and a notification unit (the processor 241 and the radio transceiver 220) that notifies the UE of the timing advance value selected among the timing advance values in the plurality of eNBs based on the notification received by the receiver. In the present embodiment, a timing advance value causing the longest delay in the data transmission timing among the timing advance values in the plurality of eNBs is selected.

As described above, in the LTE system 1, CP is provided for each symbol so as to handle a delayed wave. Thus, the eNB can demodulate even an uplink signal (uplink data) which arrives with a delay from the reception timing of the eNB if the delay is within a range of a CP length. On the other hand, it is difficult to demodulate an uplink signal which arrives earlier than the reception timing of the eNB. For this reason, the timing advance value causing the longest delay in uplink transmission timing is selected, so that the timing advance value can be properly set.

In the present embodiment, the band allocation information which is transmitted/received by each eNB (see, FIG. 22) includes a timing advance value. Accordingly, the timing advance value can be also selected in the above-described band allocation determination processing.

For example, at step S404 in FIG. 24, the eNB determines a timing advance value that the UE is to be notified of according to the timing advance value selection rule of a timing advance value created by the eNB itself and timing advance values of the respective other eNBs included in the CoMP cooperating set. Accordingly, the timing advance value can be determined only by one-direction notification. Thus, time required for determining a timing advance value can be shortened.

Then, at step S405, the eNB transmits the timing advance value determined at step S404 to the UE on PDSCH. Here, if the PDSCH resource to be allocated to the UE has free space, the eNB notifies the UE of the timing advance value (TA MCE) using the free space of the PDSCH resource. The case where there is the PDSCH resource has free space means that a bandwidth for transmission using the selected resource block and the selected MCS is larger than the data to be transmitted.

Note that if the JT-type CoMP is performed, all eNBs included in the CoMP cooperating set have to transmit downlink data in the same band. However, at timing when there is no downlink data to be cooperatively transmitted, all the eNBs included in the CoMP cooperating set may cooperatively transmit the timing advance value (TA MCE) or only an anchor eNB may transmit the timing advance value (TA MCE).

However, each eNB included in the CoMP cooperating set is not always obtained the timing advance value from all the other eNBs included in the CoMP cooperating set. Thus, the timing advance value is held for each of the other eNBs and is updated every time a new timing advance value is received. Specifically, each eNB included in the CoMP cooperating set further comprises a storage (the memory 242) for storing the timing advance value received by the receiver (the network communication unit 230) and an update unit (the processor 241) that updates the timing advance value stored in the storage with the received timing advance value every time the receiver receives the timing advance value. The notification unit (the processor 241 and the radio transceiver 220) selects the timing advance value that the UE is to be notified of among the timing advance values stored in the storage and notifies the UE of the selected timing advance value.

Also, the UE has to be notified of the timing advance value before Time Alignment Timer (first timer) of UE expires. In addition, each eNB includes a Time Alignment Timer corresponding to the Time Alignment Timer of UE. In the case of performing the JT-type CoMP, if detecting that the Time Alignment Timer of UE will expire soon, an anchor eNB may transmit a timing advance value (TA MCE) as user data, as similar to other downlink data, to the other eNBs included in the CoMP cooperating set over the X2 interface, and all the cooperating eNBs may transmit the timing advance value cooperatively as similar to other downlink data.

(7.2.3) Abnormal Time Sequence (7.2.3.1) Pattern 1

In a case where transmission/reception timeout of the band allocation information occurs frequently (or continues) between specific eNBs, congestion may be occurring on a communication path between the specific eNBs. In the present embodiment, the following configuration is used to properly address the above-described case.

In the present embodiment, each of the plurality of eNBs included in the CoMP cooperating set comprises a receiver (the network communication unit 230) that receives information on resource allocation to the UE in other eNB included in the CoMP cooperating set from the other eNB and a reporting unit (the processor 241 and the network communication unit 230) that reports the information on another specific eNB included in the CoMP cooperating set to the CoMP management apparatus (the anchor eNB) managing the CoMP cooperating set when the receiver does not normally receive the notification from the other specific eNB. The CoMP management apparatus excludes the other specific eNB and/or the reporting eNB from the CoMP cooperating set. For example, the CoMP management apparatus acquires a power level of a signal received by the UE from the other specific eNB and a power level of a signal received by the UE from the reporting eNB and excludes, from the CoMP cooperating set, one of the other specific eNB and the reporting eNB whose corresponding power level is lower than that of the other eNB.

Figure 26:
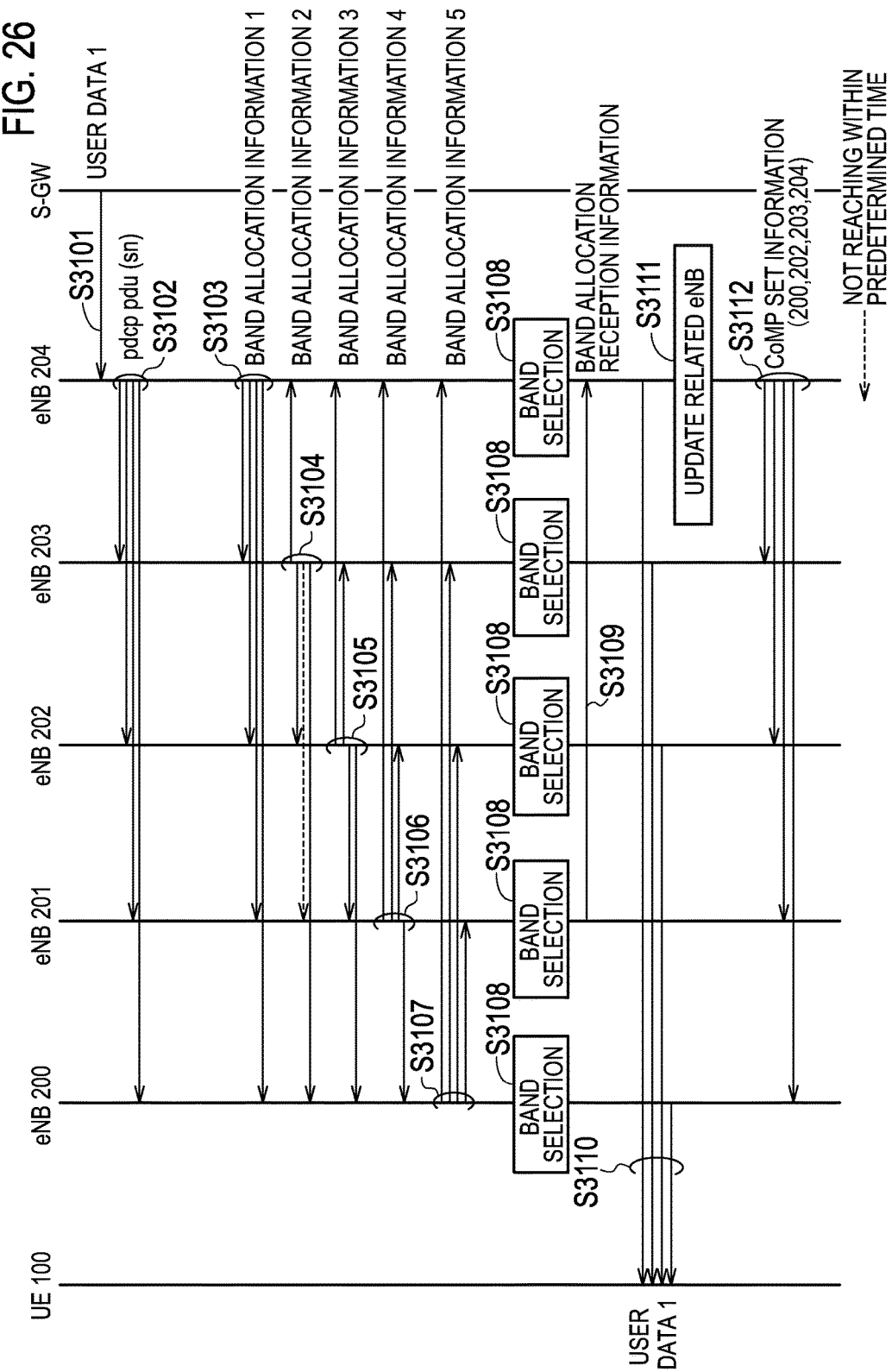
FIG. 26 illustrates a JT-type CoMP sequence.

FIG. 26 illustrates a JT-type CoMP sequence. Here, the description is given to an example in which the CoMP cooperating set formed by the eNB 200 to the eNB 204 and the UE 100 are executing the JT type CoMP and the eNB 204 operates as an anchor eNB.

As illustrated in FIG. 26, at step S3101, the eNB 204 operating as an anchor eNB receives packet data (user data) from the S-GW.

At step S3102, the eNB 204 converts the packet data in the PDCP layer to PDCP PDU with a sequence number and transfers the PDCP PDU to the eNB 200 to the eNB 203 over the X2 interface.

At step S3103, the eNB 204 creates band allocation information 1 and transfers the created band allocation information 1 to the eNB 200 to the eNB 203 over the X2 interface.

At step S3104, the eNB 203 creates band allocation information 2 and transfers the created band allocation information 2 to the eNB 200, eNB 201, eNB 202 and eNB 204 over the X2 interface. Here, it is assumed that the band allocation information 2 from the eNB 203 does not reach the eNB 201 within a predetermined time period.

At step S3105, the eNB 202 creates band allocation information 3 and transfers the created band allocation information 3 to the eNB 200, eNB 201, eNB 203 and eNB 204 over the X2 interface.

At step S3106, the eNB 201 creates band allocation information 4 and transfers the created band allocation information 4 to the eNB 200, eNB 202, eNB 203 and eNB 204 over the X2 interface.

At step S3107, the eNB 200 creates band allocation information 5 and transfers the created band allocation information 5 to the eNB 201 to the eNB 204 over the X2 interface.

At step S3108, each of the eNB 200 to the eNB 204 determines a band to be allocated to the UE 100 based on the band allocation information of the eNB itself and the band allocation information from the other eNBs. However, since the band allocation information 2 from the eNB 203 does not arrive within the predetermined time period, the eNB 201 determines the above-described allocation-disabled band.

At step S3109, the eNB 201 transmits band allocation reception information indicating that the band allocation information from the eNB 203 is not received to the eNB 204 over the X2 interface. The band allocation reception information includes an identifier of eNB 201 (or a cell identifier) and an identifier of the eNB 203 (or a cell identifier).

At step S3110, each of the eNB 200, eNB 202, eNB 203, and eNB 204 transmits the user data to the UE 100 in the allocation band determined at step S3108.

At step S3111, the eNB 204 determines an eNB to be excluded from the CoMP cooperating set based on the band allocation information received at step S3109. For example, the eNB 204 acquires a power level of a signal received by the UE 100 from the eNB 201 and a power level which is received by the UE 100 from the eNB 203 and excludes one of the eNB 201 and eNB 203 whose corresponding power level is lower than that of the other eNB, from the CoMP cooperating set. The eNB excluded from the CoMP cooperating set may be an interference source for the CoMP communication thereafter. Thus, an eNB whose interference level to be given to the UE 100 is expected to be small is excluded. Here, it is assumed that the eNB 204 determines to exclude the eNB 201. The eNB 204 updates the CoMP cooperating set information so as to reflect the exclusion of the eNB 201 when it is determined that the eNB 201 is excluded.

At step S3112, the eNB 204 transmits the updated CoMP cooperating set information to the eNB 200 to the eNB 203 (and the UE 100). The eNB 201 having received the updated CoMP cooperating set information recognizes that the eNB 201 is excluded from the CoMP cooperating set and does not join the CoMP communication thereafter.

As described above, according to the pre sent embodiment, proper processing can be performed even when a transmission/reception timeout of the band allocation information frequently occurs (or continues) between specific eNBs. Note that in the present sequence, the JT-type CoMP is described as an example. However, the sequence can be applied to other CoMP types such as JR type CoMP.

(7.2.3.2) Pattern 2

In the JR-type CoMP, the specific eNB which does not receive the band allocation information from the other eNB determines the allocation-disabled band and does not receive the uplink data from the UE 100 as described above. In this case, the anchor eNB waits for data transfer from the specific eNB although the specific eNB does not receive the uplink data.

For this reason, in the present embodiment, the following configuration is used in order to properly address the case where any of the eNBs do not receive data from the UE in the JR-type CoMP.

In the present embodiment, each of the plurality of eNBs included in the CoMP cooperating set comprises a band allocation information receiver (the network communication unit 230) that receives the band allocation information indicating a communication resource of allocation candidate for the UE in another eNB included in the CoMP cooperating set from the other eNB, and a transmission unit (the processor 241 and the network communication unit 230) that transmits information on whether the reception of the band allocation information succeeds to another eNB (the anchor eNB) included in the CoMP cooperating set based on a reception state in the band allocation information receiver. When the band allocation information receiver does not receive band allocation information from at least one of other eNBs included in the CoMP cooperating set, the transmission unit transmits error information to the other eNB (the anchor eNB) included in the CoMP cooperating set. On the other hand, when the band allocation information receiver receives the band allocation information from the other eNBs included in the CoMP cooperating set, the transmission unit transmits acknowledgement information to the other eNB (the anchor eNB).

Also, each of the plurality of eNBs further comprises a data transmission unit (the radio transceiver 220 and the processor 241) that receives data from the UE based on the band allocation information received by the band allocation information receiver. When the band allocation information receiver does not receive the band allocation information from at least one of the other eNBs included in the CoMP cooperating set, the data receiver stops the data reception from the UE.

Figure 27:
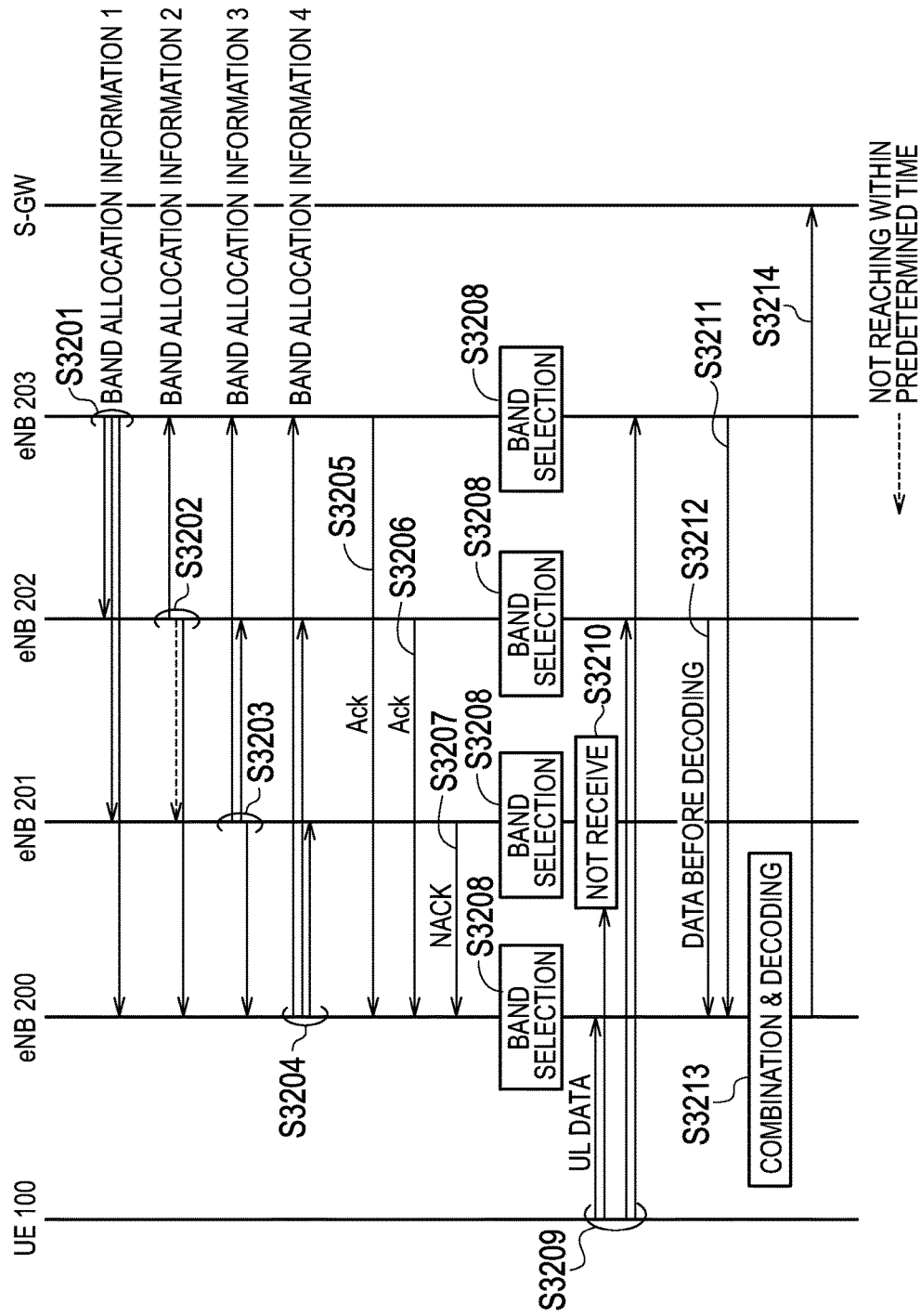
FIG. 27 illustrates a JR-type CoMP sequence.

FIG. 27 illustrates a JR-type CoMP sequence. Here, the description is given to an example in which the UE 100 and the CoMP cooperating set formed by the eNB 200 to the eNB 203 are executing the JR type CoMP and the eNB 200 operates as an anchor eNB.

As illustrated in FIG. 27, at step S3201, the eNB 203 creates band allocation information 1 and transfers the created band allocation information 1 to the eNB 200 to the eNB 202 over the X2 interface.

At step S3202, the eNB 202 creates band allocation information 2 and transfers the created band allocation information 2 to the eNB 200, eNB 201, and eNB 203 over the X2 interface. Here, it is assumed that the band allocation information 2 from the eNB 202 to the eNB 201 does not reach within a predetermined time period.

At step S3203, the eNB 201 creates band allocation information 3 and transfers the created band allocation information 3 to the eNB 200, eNB 202, and eNB 203 over the X2 interface.

At step S3204, the eNB 200 creates band allocation information 4 and transfers the created band allocation information 4 to the eNB 201 to the eNB 203 over the X2 interface.

At step S3205, the eNB 203 transmits band allocation reception information indicating that the eNB 203 received all the band allocation information with a predetermined time period to the eNB 200 over the X2 interface. The band allocation reception information includes an identifier of a transmission source eNB (or a cell identifier).

At step S3206, the eNB 202 transmits band allocation reception information (ACK) indicating that the eNB 202 received all the band allocation information within a predetermined time period to the eNB 200 over the X2 interface.

At step S3207, the eNB 201 transmits band allocation reception information (NACK) indicating that the eNB 201 did not receive at least one piece of the band allocation information within the predetermined time period (and/or stops the reception of the uplink data) to the eNB 200 over the X2 interface.

At step S3208, each of the eNB 200 to the eNB 203 determines a band to be allocated to the UE 100 based on the band allocation information of the eNB itself and the band allocation information from the other eNBs. However, since the band allocation information 2 from the eNB 202 has not reached within the predetermined time period, the eNB 202 determines the allocation-disabled band as described above. The UE 100 is notified of the allocation band determined at step S3208 over the E-PDCCH.

At step S3209, the UE 100 transmits uplink data using the allocation band. Each of the eNB 200, the eNB 202, and the eNB 203 receives the uplink data. On the other hand, the eNB 201 does not receive the uplink data (step S3210).

At step S3211, the eNB 203 transfers the uplink data received from the UE 100 with the data being in a state of a baseband signal (a state before decoding) to the eNB 200 over the X2 interface.

At step S3212, the eNB 202 transfers the uplink data received from the UE 100 with the data being in a state of a baseband signal (a state before decoding) to the eNB 200 over the X2 interface.

Note that the eNB 200 recognizes that there is no data transfer from the eNB 201 based on the band allocation reception information (NACK) received at step S3207.

At step S3213, the eNB 200 decodes the uplink data received by the eNB itself from the UE 100, the uplink data transferred from the eNB 202, and the uplink data transferred from the eNB 201 after the uplink data being combined.

At step S3214, the eNB 200 transfers the data after decoding with the data being in a state of IP packet to the S-GW on the S1 interface.

As described above, according to the pre sent embodiment, the anchor eNB can be prevented from waiting for the data transfer from a specific eNB under the condition in which the specific eNB has not received uplink data. Thus, an increase in communication delay can be avoided.

(7.3) Data Synchronization and Retransmission Control

Hereinafter, data synchronization and retransmission control in the JT-type CoMP are described.

(7.3.1) Data Synchronization and ARQ Retransmission

In the JT-type CoMP, when the CoMP cooperating set is formed by different eNBs, there is a following problem. In a layer 2 of each eNB included in the CoMP cooperating set, when user data is converted to PDCP PDU in a PDCP layer, and thereafter ARQ in an AM mode is executed in a RLC layer, the eNBs perform data division differently from each other in the RLC layer (see, FIG. 5 and FIG. 6). As a result, it is difficult for the eNBs to transmit same data to the UE at the same time.

For this reason, the present embodiment uses the following configuration in order to cause each eNBs to transmit same data to the UE at the same time even when the CoMP cooperating set is formed by the different eNBs.

In the present embodiment, an anchor eNB has a receiver (the network communication unit 230) that receives user data addressed to UE from an S-GW, a conversion unit (the processor 241) that converts the user data received by the receiver to PDCP PDU to which a sequence number is added in the PDCP layer, and a transmission unit (the network communication unit 230 and the processor 241) that transmits the PDCP PDU obtained by the conversion unit to another eNB (subordinate eNB) included in the CoMP cooperating set. When receiving the PDCP PDU, the other eNB (subordinate eNB) processes the PDCP PDU in the MAC layer without applying ARQ retransmission in the RLC layer. For example, a UM mode is applied to the RLC layer in the other eNB (subordinate eNB). The processing in the MAC layer includes HARQ (see, FIG. 5).

Also, in the present embodiment, the subordinate eNB comprises a transmission unit (the radio transceiver 220 and the processor 241) that performs HARQ data transmission to the UE and a notification unit (the network communication unit 230 and the processor 241) that notifies the anchor eNB of a failure of the HARQ data transmission when the HARQ data transmission fails. The anchor eNB has a management unit (the processor 241 and the memory 242) that collectively manages ARQ retransmission data (PDCP PDU) from the CoMP cooperating set to the UE, a receiver (the network communication unit 230) that receives a notification of the failure of the HARQ data transmission from the subordinate eNB, and a transfer unit (the network communication unit 230 and the memory 242) that transfers the ARQ retransmission data which is managed by the management unit to the subordinate eNB in response to the notification received by the receiver. The transmission unit of the subordinate eNB transmits ARQ retransmission data transferred from the anchor eNB to the UE using the HARQ.

Figure 28:
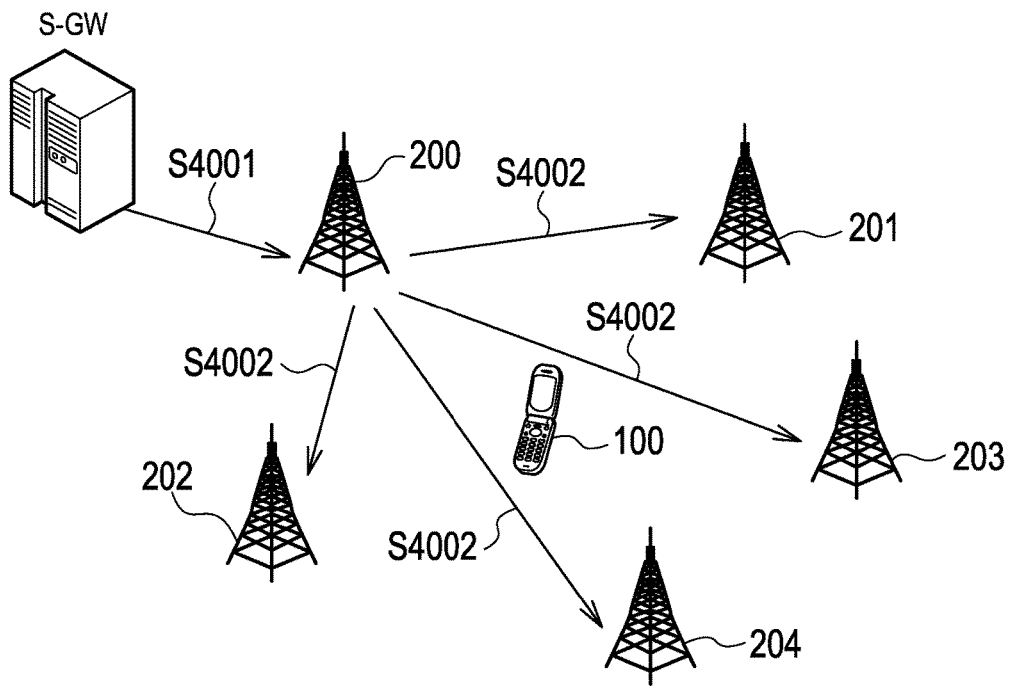
FIG. 28 illustrates a JT-type CoMP sequence.

FIG. 28 illustrates a JT-type CoMP sequence. Here, the description is given to an example in which the UE 100 and the CoMP cooperating set formed by the eNB 200 to the eNB 204 are executing the JT type CoMP and the eNB 200 operates as an anchor eNB.

As illustrated in FIG. 28, at step S4001, the S-GW transmits user data addressed to the UE 100 to the eNB 200 on the S1 interface.

The PDCP layer of the eNB 200 performs header compression/encryption of the user data addressed to the UE 100 and converts the resultant data to PDCP PDU (see FIG. 5 and FIG. 6). In addition, the PDCP layer of the eNB 200 adds a sequence number for identifying the PDCP PDU to the PDCP PDU. Furthermore, the PDCP PDU with a sequence number is stored for retransmission.

At step S4002, the eNB 200 transfers the PDCP PDU with a sequence number to the eNB 201 to the eNB 204 over the X2 interface.

Then, in the eNB 200 to the eNB 204, the RLC layer performs conversion to PLC PDU without applying ARQ to the PDCP PDU (RLC SDU) with a sequence number, and the MAC layer performs conversion to a transport block by applying HARQ to the RLC PDU (MAC SDU), and the physical layer transmits the transport block. Here, the same band (resource block, sub-frame, MCS) is used for transmission in the physical layer in the eNB 200 to the eNB 204.

Also, each MAC layer of the eNB 200 to the eNB 204 performs retransmission in response to ACK/NACK (HARQ ACK/NACK) from the UE 100.

Figure 29:
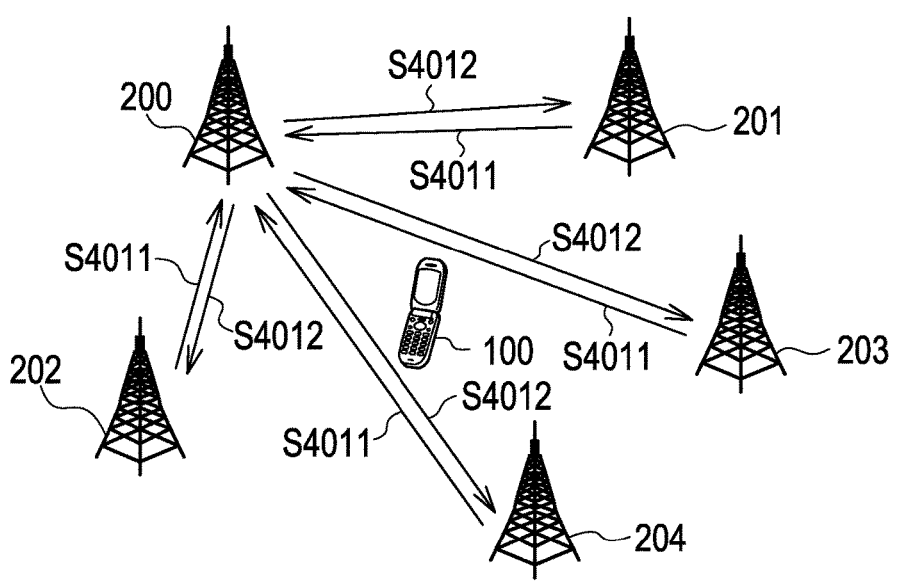
FIG. 29 illustrates a sequence in a case where HARQ retransmission does not complete even when it reaches the maximum retransmission number.

FIG. 29 illustrates a sequence in a case where HARQ retransmission does not complete even when it reaches the maximum retransmission number.

As illustrated in FIG. 29, when the HARQ retransmission dose not terminate even when it reaches the maximum retransmission number (i.e., in a case where HARQ ACK is not obtained), at step S4011, the eNB 201 to the eNB 204 notify the eNB 200 of a failure of data transmission over the X2 interface. The notification contains a sequence number of PDCP PDU having the failure of the data transmission.

At step S4012, the eNB 200 transfers PDCP PDU (with a sequence number) in which ARQ retransmission should be performed in response to the notification from the eNB 201 to the eNB 204 over the X2 interface.

Then, in the eNB 200 to the eNB 204, the RLC layer performs conversion to PLC PDU without applying ARQ to the PDCP PDU (RLC SDU) with a sequence number, and the MAC layer performs conversion to a transport block by applying HARQ to the RLC PDU (MAC SDU), and the physical layer transmits the transport block. Here, the same band (resource block, sub-frame, MCS) is used for transmission in the physical layer in the eNB 200 to the eNB 204.

As described above, the ARQ retransmission is collectively managed by the anchor eNB, so that the eNBs included in the CoMP cooperating set can transmit same data to the UE at the same time in the JT-type CoMP.

(7.3.2.1) HARQ First Transmission Allocation Interval

The eNB repeatedly performs data retransmission by using the HARQ in the MAC layer until ACK (HARQ ACK) from the UE is obtained. Here, transmission processing of first transmission data and retransmission processing for the first transmission data are referred to as "HARQ process" and a plurality of HARQ processes are executed in parallel.

In the JT-type CoMP, when the CoMP cooperating set is formed by different eNBs, it is considered that negotiation among the eNBs is needed for allocating the same band for HARQ retransmission to the UE. However, if such negotiation is performed for every retransmission, processing delay for retransmission is so long that the HARQ retransmission cannot be properly performed.

For this reason, the present embodiment uses the following configuration to properly perform the HARQ retransmission in the downlink CoMP.

In the present embodiment, each of the plurality of eNBs included in the CoMP cooperating set comprises a first transmission unit (the radio transceiver 220 and the processor 241) that transmits first transmission data in each of the plurality of HARQ processes and a retransmission unit (the radio transceiver 220, the processor 241 and the memory 242) that transmits retransmission data corresponding to the first data in each of the plurality of HARQ processes. A transmission interval of the first transmission data by the first transmission unit is set to be a minimum odd number larger than a maximum HARQ retransmission number.

Also, a retransmission interval of the retransmission data by the retransmission unit is limited to 8 [TTI (Transmission Time Interval)]. In other words, when allocation cannot be performed, a shift to the next TTI is prohibited. Furthermore, the retransmission unit transmits the retransmission data by applying the resource block and MCS same as those of the first transmission data.

Figure 30:
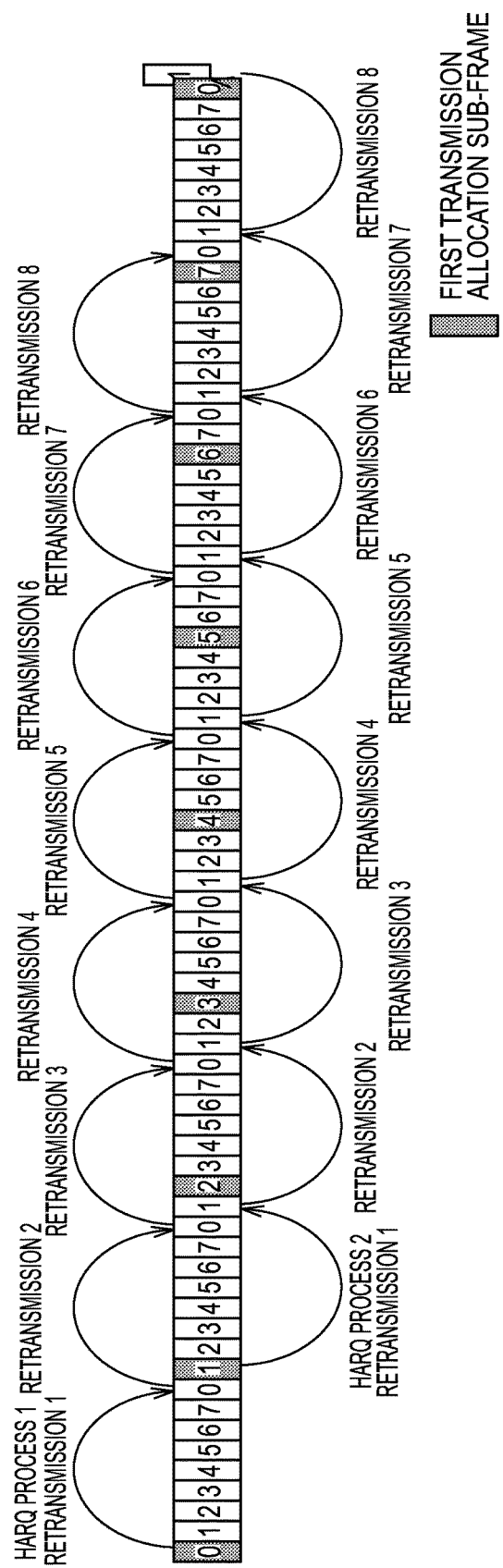
FIG. 30 is a drawing for illustrating the HARQ retransmission in a MAC layer.

FIG. 30 is a drawing for illustrating HARQ retransmission in a MAC layer.

As shown in FIG. 30, each HARQ process performs retransmission by 8 [TTI] according to the HARQ NACK from the UE.

On the other hand, the transmission interval of the first transmission data is 9[TTI]. In other words, the first transmission interval (9[TTI]) is a value in which "1" is added to the retransmission interval (8[TTI]). Thus, the first transmission timing and the retransmission timing are not overlapped with each other until the retransmission number turns 8. However, when the retransmission number turns 9, the first transmission timing and the retransmission timing are overlapped with each other. However, the maximum HARQ retransmission number is 8. Thus, the first transmission timing and the retransmission timing are not overlapped with each other. In the present embodiment, the first transmission interval is set to be "9" [TTI] which is the minimum odd number larger than the maximum HARQ retransmission number, 8.

By setting as such, the first transmission timing and retransmission timing of the HARQ process do not overlap with each other.

Also, in each HARQ process, retransmission is performed using the resource block same as the resource block used at the first transmission, and retransmission is also performed using the MCS same as the MCS used at the first transmission. If such rule is introduced to the CoMP cooperating set, negotiation among the eNBs for HARQ retransmission is unnecessary. Thus, the processing delay for retransmission can be prevented from becoming long.

(7.3.2.2) HARQ ACK

The eNB repeatedly performs data retransmission until ACK from the UE is obtained using the HARQ in the MAC layer. However, if the CoMP cooperating set is formed by different eNBs in the JT-type CoMP, there is a possibility that any of the eNBs included in the CoMP cooperating set cannot receive the ACK even when the UE transmits the ACK. The eNB which cannot receive the ACK from the UE continues the retransmission to the UE. Thus, there is a problem that the resource is uselessly consumed by the retransmission.

For this reason, the present embodiment uses the following configuration to properly perform the HARQ retransmission in the downlink CoMP.

In the present embodiment, when receiving the HARQ ACK from the UE, each of the plurality of eNBs included in the CoMP cooperating set transmits ACK information on the received HARQ ACK to the other eNBs included in the CoMP cooperating set. The ACK information includes identification information of data corresponding to the HARQ ACK. Each of the plurality of eNBs performs HARQ retransmission to the UE, if the retransmission does not reach the maximum HARQ retransmission number, if the HARQ ACK from the UE is not received and if the ACK information from the other eNBs included in the CoMP cooperating set is not received.

Figure 31:
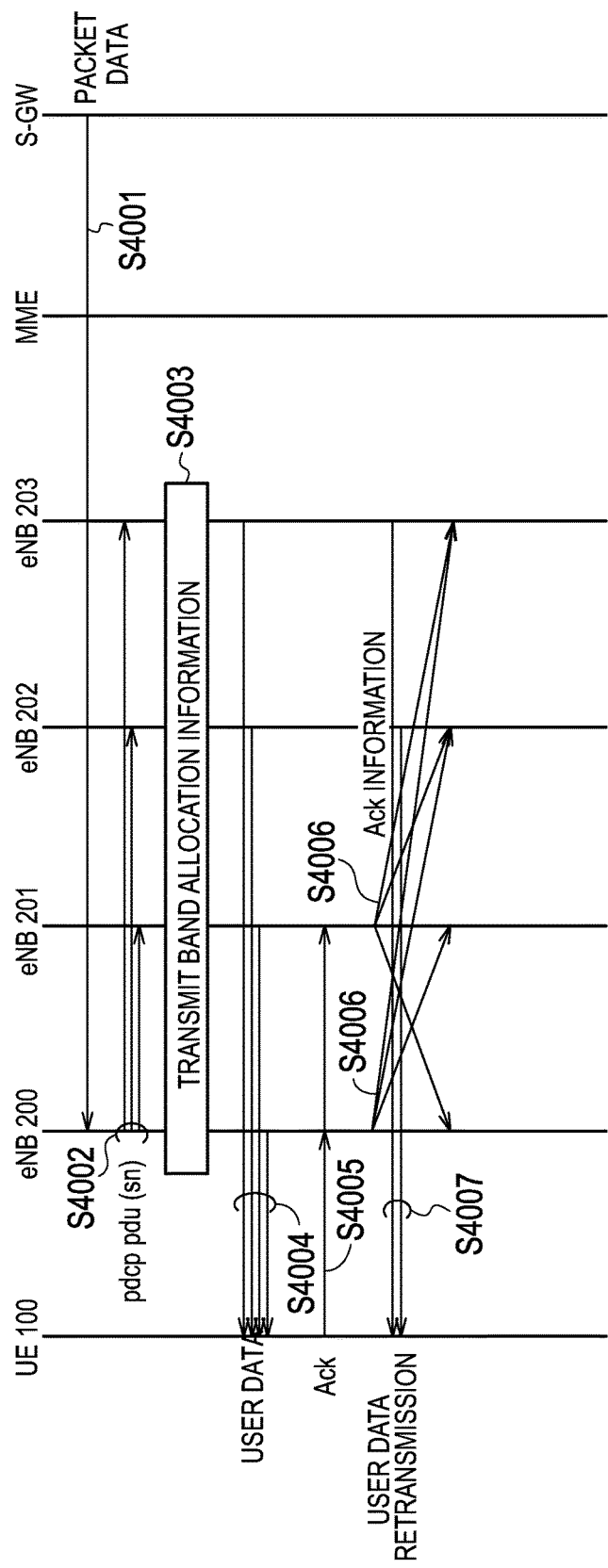
FIG. 31 illustrates a JT-type CoMP sequence.

FIG. 31 illustrates a JT-type CoMP sequence. Here, the description is given to an example in which the CoMP cooperating set formed by the eNB 200 to the eNB 203 and the UE 100 are executing the JT type CoMP and the eNB 200 operates as an anchor eNB.

As illustrated in FIG. 31, at step S4001, the eNB 200 operating as an anchor eNB receives packet data (user data) from the S-GW.

At step S4002, the eNB 200 converts the packet data in the PDCP layer to PDCP PDU with a sequence number and transfers the PDCP PDU to the eNB 200 to the eNB 203 over the X2 interface.

At step S4003, each of the eNB 200 to the eNB 203 creates band allocation information and transfers the created band allocation information to another eNB included on the CoMP cooperating set over the X2 interface.

At step S4004, each of the eNB 200 to the eNB 203 transmits same user data in the same band to the UE 100. Here, it is assumed that the received user data is successfully decoded.

At step S4005, the UE 100 transmits HARQ ACK indicating successful decoding. The eNB 200 and the eNB 201 receive the HARQ ACK, and the eNB 202 and the eNB 203 fail reception of the HARQ ACK.

At step S4006, the eNB 200 and the eNB 201 creates ACK information on the HARQ ACK from the UE 100 and transfers the created ACK information to other eNBs included in the CoMP cooperating set over the X2 interface. The ACK information includes an identifier of user data (e.g., a PDCP PDU sequence number) and HARQ ACK. FIG. 31 illustrates an example in which transmission delay of the X2 interface is longer than the retransmission interval and the HARQ retransmission is started before receiving the ACK information.

At step S4007, the eNB 202 and the eNB 203 do not receive the HARQ ACK, and thus transmit the retransmission data corresponding to the user data transmitted at step S4004 to the UE 100. After that, the eNB 200 and the eNB 201 stop retransmission processing when the ACK information is received over the X2 interface. Note that, each eNB performs HARQ retransmission to the UE if the retransmission does not reach the maximum HARQ retransmission number, if the HARQ ACK from the UE is not received and also if the ACK information from the other eNBs included in the CoMP cooperating set is not received.

As described above, in the present embodiment, when receiving the HARQ ACK from the UE, the each of the plurality of eNBs included in the CoMP cooperating set transmits ACK information on the received HARQ ACK to the other eNBs included in the CoMP cooperating set. Accordingly, even the eNB which cannot receive the ACK from the UE can stop retransmission to the UE. Thus, the resource can be prevented from being uselessly consumed by the retransmission. If an eNB which does not recognize ACK performs retransmission using a resource while an eNB having received the ACK allocates the resource to another UE, interference may occur. Thus, the interference can be prevented by the configuration that is enabled to stop the retransmission.

(8) Other Embodiments

As described above, the present invention has been described by using the above-described embodiments. However, it should not be understood that the description and the drawings, which constitute one part of this disclosure, are to limit the present invention. Various alternative embodiments, examples, and operational techniques will be obvious for those who are in the art from this disclosure.

As for the control for the CoMP, the "anchor eNB" described above may be read as "MME" or "S-GW" and at least part of the control executed by the anchor eNB may be executed by an EPC side (MME or S-GW). In this case se, MME or S-GW is equivalent to the CoMP management apparatus which manages the CoMP cooperating set.

Also, in the above-described embodiment, the description is given to an example in which the CoMP cooperating set is formed by a plurality of eNBs. However, the CoMP cooperating set may include a relay node (RN). The RN is a relay station configuring a backhaul wirelessly and is recognized by the UE as a cell as similar to the eNB. Also, the CoMP cooperating set may include RRH (Remote Radio Head). The RRH is a radio unit installed spaced apart from the base band unit and connected with the base band unit via an optical fiber or the like.

In addition, the entire content of U.S. Provisional Application No. 61/588,533 (filed on Jan. 19, 2012) and the entire content of U.S. Provisional Application No. 61/598,714 (filed on Feb. 14, 2012) are incorporated in the present specification by reference.

INDUSTRIAL APPLICABILITY

As described above, a mobile communication system, a base station and communication control method according to the present invention can shorten a time required to determine a communication resource to be allocated to the user terminal in CoMP. Thus, the present invention is useful in the field of mobile communications.

The invention claimed is:

1. A mobile communication system, comprising:
a plurality of base stations included in a Coordinated Multi-Point (CoMP) cooperating set for performing CoMP communication, wherein
each of the plurality of base stations comprises:
a receiver configured to receive a CoMP allocation candidate notification from another base station included in the CoMP cooperating set, the CoMP allocation candidate notification including:
resource block information that indicates allocation candidate resource blocks to be used for the CoMP communication,
a system frame number (SFN) and a subframe number that indicate allocation candidate time corresponding to the resource block information, and
a value for determining whether the CoMP allocation candidate notification should be applied for allocating communication resources to a user terminal; and
a processor configured to select a communication resource to be allocated to the user terminal, based on the CoMP allocation candidate notification received by the receiver.

2. The mobile communication system according to claim 1, wherein the processor is configured to select the communication resource to be allocated to the user terminal according to a selection rule common to the plurality of base stations.

3. A base station included in a Coordinated Multi-Point (CoMP) cooperating set for performing CoMP communication, the base station comprising:
a receiver configured to receive a CoMP allocation candidate notification from another base station included in the CoMP cooperating set, the CoMP allocation candidate notification including:
resource block information that indicates allocation candidate resource blocks to be used for the CoMP communication,
a system frame number (SFN) and a subframe number that indicate allocation candidate time corresponding to the resource block information, and
a value for determining whether the CoMP allocation candidate notification should be applied for allocating communication resources to a user terminal; and
a processor configured to select a communication resource to be allocated to the user terminal, based on the CoMP allocation candidate notification received by the receiver.

4. A base station included in a Coordinated Multi-Point (CoMP) cooperating set for performing CoMP communication, the base station comprising:
a transmitter configured to transmit a CoMP allocation candidate notification to another base station included in the CoMP cooperating set, the CoMP allocation candidate notification including:
resource block information that indicates allocation candidate resource blocks to be used for the CoMP communication, a system frame number (SFN) and a subframe number that indicate allocation candidate time corresponding to the resource block information, and a value for determining whether the CoMP allocation candidate notification should be applied for allocating communication resources to a user terminal;

wherein the CoMP allocation candidate notification enables said another base station to select a communication resource to be allocated to the user terminal.

* * * * *